US009908054B2

(12) United States Patent
Joo et al.

(10) Patent No.: US 9,908,054 B2
(45) Date of Patent: *Mar. 6, 2018

(54) METHOD, SYSTEM AND COMPUTER READABLE RECORDING MEDIUM FOR PROVIDING A GAME RANKING IN A GAME SERVICE PLATFORM

(71) Applicant: K-INNOVATION, Seongnam-si (KR)

(72) Inventors: Seong Youn Joo, Seongnam-si (KR); Kyung E Moon, Seongnam-si (KR)

(73) Assignee: K-INNOVATION, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/139,945

(22) Filed: Apr. 27, 2016

(65) Prior Publication Data
US 2016/0236095 A1 Aug. 18, 2016

Related U.S. Application Data

(63) Continuation-in-part of application No. 14/858,579, filed on Sep. 18, 2015, which is a continuation of
(Continued)

(30) Foreign Application Priority Data

Jun. 16, 2011 (KR) .................. 10-2011-0058659
Jun. 17, 2011 (KR) .................. 10-2011-0058975

(51) Int. Cl.
*A63F 9/24* (2006.01)
*A63F 13/798* (2014.01)
(Continued)

(52) U.S. Cl.
CPC .......... *A63F 13/798* (2014.09); *A63F 13/12* (2013.01); *A63F 13/335* (2014.09); *A63F 13/46* (2014.09);
(Continued)

(58) Field of Classification Search
USPC ................. 463/16–25, 40–43; 273/292
See application file for complete search history.

(56) References Cited

U.S. PATENT DOCUMENTS 7,549,924 B2 6/2009 Canessa et al.
7,640,341 B2 12/2009 Regan
(Continued)

FOREIGN PATENT DOCUMENTS

JP 2002-140524 5/2002
JP 2002-248273 9/2002
(Continued)

OTHER PUBLICATIONS

Jang, Jeseok, "NC Strengthens Casual Line-up with 'Pop Cap World' Order Sheet", Gamemeca, http://www.gamemeca.com/news/view.php?gid=88491, Sep. 14, 2010.
(Continued)

*Primary Examiner* — Masud Ahmed
(74) *Attorney, Agent, or Firm* — H.C. Park & Associates, PLC

(57) ABSTRACT

A ranking method and system for providing a ranking of a game friend. The method includes registering a game friend who has joined a game service. The method further includes calculating a ranking of the user with respect to a game friend based on a ranking inquiry request received from the user terminal, and providing the user terminal with the calculated ranking of the user. The user terminal drives a game service platform associated with a plurality of games and provides some information needed for automatic friend registration and the ranking inquiry request information through the game service platform.

20 Claims, 25 Drawing Sheets

Related U.S. Application Data application No. 14/167,872, filed on Jan. 29, 2014, now Pat. No. 9,149,726, which is a continuation of application No. 13/526,465, filed on Jun. 18, 2012, now Pat. No. 8,696,467, application No. 15/139,945, which is a continuation-in-part of application No. 13/495,422, filed on Jun. 13, 2012.

(51) Int. Cl.
| | | |
|---|---|---|
| A63F 13/537 | (2014.01) | |
| A63F 13/30 | (2014.01) | |
| A63F 13/795 | (2014.01) | |
| A63F 13/46 | (2014.01) | |
| A63F 13/335 | (2014.01) | |

(52) U.S. Cl.
CPC .......... *A63F 13/537* (2014.09); *A63F 13/795* (2014.09); *A63F 2300/556* (2013.01); *A63F 2300/558* (2013.01); *A63F 2300/61* (2013.01)

(56) References Cited

U.S. PATENT DOCUMENTS

| | | | | |
|---|---|---|---|---|
| 7,819,749 | B1* | 10/2010 | Fish et al. | 463/42 |
| 7,828,661 | B1* | 11/2010 | Fish et al. | 463/42 |
| 8,388,446 | B1 | 3/2013 | Craine et al. | |
| 8,696,467 | B2 | 4/2014 | Joo et al. | |
| 8,979,647 | B2 | 3/2015 | Ostergren et al. | |
| 2004/0192440 | A1 | 9/2004 | Evans et al. | |
| 2004/0224772 | A1 | 11/2004 | Canessa et al. | |
| 2004/0259641 | A1 | 12/2004 | Ho | |
| 2005/0070359 | A1 | 3/2005 | Rodriquez et al. | |
| 2006/0247055 | A1 | 11/2006 | O'Kelley et al. | |
| 2006/0258463 | A1* | 11/2006 | Cugno et al. | 463/42 |
| 2006/0287106 | A1 | 12/2006 | Jensen | |
| 2007/0173325 | A1 | 7/2007 | Shaw et al. | |
| 2007/0191101 | A1* | 8/2007 | Coliz et al. | 463/42 |
| 2007/0191102 | A1* | 8/2007 | Coliz et al. | 463/42 |
| 2009/0054123 | A1 | 2/2009 | Mityagin et al. | |
| 2009/0075738 | A1 | 3/2009 | Pearce | |
| 2009/0111576 | A1 | 4/2009 | Ostergren et al. | |
| 2009/0271714 | A1 | 10/2009 | Cox et al. | |
| 2009/0325712 | A1 | 12/2009 | Rance | |
| 2010/0035689 | A1* | 2/2010 | Altshuler et al. | 463/39 |
| 2010/0222147 | A1 | 9/2010 | Langan et al. | |
| 2011/0250971 | A1 | 10/2011 | Van Os et al. | |

FOREIGN PATENT DOCUMENTS

| | | |
|---|---|---|
| JP | 2002-331171 | 11/2002 |
| JP | 2003-024643 | 1/2003 |
| JP | 2003-038855 | 2/2003 |
| JP | 2004-329914 | 11/2004 |
| JP | 2006-158956 | 6/2006 |
| JP | 2007-206823 | 8/2007 |
| JP | 2008-018189 | 1/2008 |
| JP | 2008-538318 | 10/2008 |
| JP | 2009-022365 | 2/2009 |
| JP | 2009-183567 | 8/2009 |
| JP | 2011-500277 | 1/2011 |
| JP | 2011-101775 | 5/2011 |
| JP | 2013-000588 | 1/2013 |
| KR | 10-2000-0060795 | 10/2000 |
| KR | 10-2002-0039909 | 5/2002 |
| KR | 10-2002-0089856 | 11/2002 |
| KR | 10-2004-0095633 | 11/2004 |
| KR | 10-2004-0111191 | 12/2004 |
| KR | 10-2006-0031836 | 4/2006 |
| KR | 10-2006-0042469 | 5/2006 |
| KR | 10-2006-0112723 | 11/2006 |
| KR | 10-2008-0012128 | 2/2008 |
| KR | 10-2008-0029717 | 4/2008 |
| KR | 10-2008-0081686 | 9/2008 |
| KR | 10-2009-0017227 | 2/2009 |
| KR | 10-2010-0052795 | 5/2010 |
| KR | 10-2010-0075516 | 7/2010 |

OTHER PUBLICATIONS

Jung, Yu Hee, "'Mat-Go' to a Social Age? Go-stop Enters Facebook", Zdnet, http://www.zdnet.co.kr/news/news_view.asp?article_id=20110128152735&type=det, Jan. 28, 2011.

Park, Gye Hyun, "Social Games, The Influence doubles when they unite", Inews, http://news.inews24.com/php/news_view.php?g_serial=570872&g_menu=020500&rrf=nv, May 4, 2011.

EA Korea, "<Battlefield 3><FIFA 12>, etc., the platforms which delivers the best game contents directly to the consumers," URL: http://www.thisisgame.com/board/view.php?id=674632&category=101, published: Jun. 8, 2011, retrieved: Dec. 16, 2012.

Mixi, Nikkei Personal Computing, pp. 48, 49, and 113, http://pc.nikkeibp.co.jp/, Jan. 24, 2011.

Social game based on Facebook, Nov. 30, 2010.

How to use Facebook, Find Friend, Manage Friend (Make Friend List), HolySky.com, Dec. 1, 2010.

Korean Office Action issued on Feb. 13, 2014, in Korean Application No. 10-2013-0116525.

Non Final Office Action issued on Aug. 2, 2013, in U.S. Appl. No. 13/526,465.

Notice of Allowance issued on Jan. 6, 2014, in U.S. Appl. No. 13/526,465.

Non Final Office Action issued on Jan. 5, 2015, in U.S. Appl. No. 14/167,872.

Non Final Office Action issued on Feb. 11, 2015, in U.S. Appl. No. 13/495,422.

Non Final Office Action issued on Mar. 26, 2015, in U.S. Appl. No. 14/536,348.

Final Office Action issued on Apr. 29, 2015, in U.S. Appl. No. 14/167,872.

Non Final Office Action issued on Jun. 10, 2015, in U.S. Appl. No. 14/536,229.

Final Office Action issued on Jun. 12, 2015, in U.S. Appl. No. 13/495,422.

Non Final Office Action issued on Jun. 19, 2015, in U.S. Appl. No. 14/536,202.

Non Final Office Action issued on Jun. 23, 2015, in U.S. Appl. No. 14/536,260.

Notice of Allowance issued on Jul. 24, 2015, in U.S. Appl. No. 14/167,872.

Final Office Action issued on Sep. 22, 2015, in U.S. Appl. No. 14/536,229.

Final Office Action issued on Sep. 24, 2015, in U.S. Appl. No. 14/536,348.

Final Office Action dated Aug. 25, 2016, in U.S. Appl. No. 13/495,422.

"I will enjoy a game by Game Center", "iPad Perfect Manual for iOS4", Dec. 31, 2010, pp. 191-196, vol. 2, Sotec, Inc.

Non-Final Office Action dated Nov. 16, 2016 in U.S. Appl. No. 14/536,301.

Non-Final Office Action dated Nov. 22, 2016 in U.S. Appl. No. 14/536,202.

Non-Final Office Action dated Feb. 6, 2017 in U.S. Appl. No. 14/858,579.

Notice of Allowance dated May 26, 2017, in U.S. Appl. No. 14/858,579.

Final Office Action was dated Jun. 8, 2017, in U.S. Appl. No. 14/536,301.

Non-Final Office Action dated Jul. 20, 2017, in U.S. Appl. No. 13/495,422.

Non-Final Office Action dated Jul. 24, 2017, in U.S. Appl. No. 14/802,367.

Final Office Action dated Sep. 12, 2017 in U.S. Appl. No. 14/536,202.

Non-Final Office Action dated Sep. 13, 2017 in U.S. Appl. No. 14/536,301.

(56) References Cited

OTHER PUBLICATIONS

Non Final Office Action dated Dec. 7, 2017, in U.S. Appl. No. 14/858,579.
Non Final Office Action dated Dec. 20, 2017, in U.S. Appl. No. 14/536,202.
Final Office Action dated Jan. 8, 2018, in U.S. Appl. No. 14/802,367.

* cited by examiner

| | | |
|---|---|---|
| 2210 — User ID | | Sims04 |
| 2220 — Nickname | | Child of Rambo |
| 2230 — Groups (tags) that I created | 1 | Orange County working mom |
| | 2 | Stunning Beauty K |
| | ⋮ | |
| 2240 — Joined groups (tags) | 1 | Drama Buff |
| | 2 | NHN |
| | ⋮ | |
| 2250 — Registered friends | | Brown Bear |
| | | Blackie |
| | | Eagle SAM |
| | | ⋮ |
| 2260 — Joined SNS | | Facebook |
| | | ⋮ |
| 2270 — My score | | 14580000 point |

METHOD, SYSTEM AND COMPUTER READABLE RECORDING MEDIUM FOR PROVIDING A GAME RANKING IN A GAME SERVICE PLATFORM

CROSS REFERENCE TO RELATED APPLICATIONS

This application is a continuation-in-part of continuation of U.S. patent application Ser. No. 14/858,579, filed on Sep. 18, 2015, which is a continuation of U.S. patent application Ser. No. 14/167,872, filed on Jan. 29, 2014, and now issued as U.S. Pat. No. 9,149,726, which is a continuation of U.S. patent application Ser. No. 13/526,465, filed on Jun. 18, 2012, and now issued as U.S. Pat. No. 8,696,467, and claims priority from and the benefit of Korean Patent Application No. 10-2011-0058975, filed on Jun. 17, 2011, and is also a continuation-in-part of U.S. patent application Ser. No. 13/495,422, filed on Jun. 13, 2012, and claims priority from and the benefit of Korean Patent Application No. 10-2011-0058659, filed on Jun. 16, 2011, each of which is hereby incorporated by reference for all purposes as if fully set forth herein.

BACKGROUND

Field

Exemplary embodiments of the present invention relate to a method, a system, and a computer-readable recording medium for providing a ranking of a registered game friend for a game provided by a game service platform.

Discussion of the Background

As the performance of recently released smart phones is enhanced, users may move from general cellular phones to smart phones. A smart phone is an intelligent cellular phone having computer support functions such as, personal digital assistant (PDA) functions, Internet functions, and moving image playback functions, while still providing original functions of the cellular phone. The smart phone may have a variety of input methods and a touch screen to provide a convenient interface for use. In addition, the smart phone may be connected to the Internet and other computers with the support of wireless Internet functions so as to perform functions, such as e-mail, web browsing, facsimile, banking, and/or playing a game. The smart phone is equipped with a standardized operating system (OS) or a dedicated operating system to perform a variety of functions.

Since a variety of functions can be implemented through various client terminal devices such as the smart phone, a variety of dedicated application programs and contents operating within the client terminal device have been developed. In addition, as the functions for client terminal devices are improved, a large number of mobile games that users can enjoy in an environment similar to the web have been developed. Numerous network games have been developed to allow users who have connected to a network through client terminal devices to play the same game while being connected with the network. When a user is playing a game, a game client is generally mounted on the client terminal device and connected to a game server through a wired or wireless communication network, so as to execute the game on the client terminal device.

Most games record game points of each user and show a ranking of the game points. However, since a conventional ranking service provided for a game shows a general ranking of the game users, the general rankings generally do not provide information that motivates the game users, and the rankings are not shown in a variety of ways. Accordingly, there is a limitation in providing meaningful information.

A variety of user terminal devices provide various applications such as social network service (SNS) programs for forming relationships among users, beyond the functions of a cellular phone and/or functions of simply providing information. Accordingly, it would be desirable to develop a method capable of constructing human networks related to games and forming new communities through existing social networks not only by simply providing a game to individual users, but by also closely connecting game users in online games.

The above information disclosed in this background section is only for enhancement of understanding of the background of the invention and therefore it may contain information that does not form any part of the prior art nor what the prior art may suggest to a person of ordinary skill in the art.

SUMMARY

Exemplary embodiments relate to a method and a system for registering game friends and providing a ranking of a registered game friend in a game service provided through a client terminal device.

Additional features of the invention will be set forth in the description which follows, and in part will be apparent from the description, or may be learned by practice of the invention.

An exemplary embodiment discloses a method performed by a game service platform server including a group ranking management module to provide a ranking of a game group. The method includes creating, in response to a game group creation request received from a client terminal of a client, the game group including the client and at least one member among registered friends of the client. The registered friends have joined a game service. The method further includes calculating a ranking of the client with respect to other members of the created game group in response to a ranking inquiry request received from the client terminal, and providing the client terminal with the calculated ranking of the client. The client terminal drives the game service platform associated with a plurality of games and provides the game group creation request and the ranking inquiry request through the game service platform.

An exemplary embodiment also discloses a method performed by a game service platform server including a group ranking management module to provide a ranking of a game group. The method includes creating, in response to a game group creation request received from a client terminal of a client, a game group including a client and at least one member among members having joined a game service, calculating a ranking of the client with respect to other members of the created game group in response to a ranking inquiry request received from the client terminal. The method further includes providing the client terminal with the calculated ranking of the client. The client terminal drives a game service platform associated with a plurality of games and provides the game group creation request and the ranking inquiry request through the game service platform, and the game group creation request information further includes at least one piece of tag information mapped to the created game group.

An exemplary embodiment further discloses a system to provide a ranking of a game group. The system includes a client terminal of a client and a game service platform server. The client terminal drives a game service platform associated with a plurality of games and provides a game group creation request and a ranking inquiry request through the game service platform. The game service platform server includes a group ranking management module to create, in response to the game group creation request received from the client terminal, the game group including the client and at least one member among registered friends of the client having joined a game service. The group ranking management module is configured to calculate a ranking of the client with respect to other members of the created game group in response to the ranking inquiry request received from the client terminal, and to provide the client terminal with the calculated ranking of the client.

An exemplary embodiment discloses a system to provide a ranking of a game group. The system includes a client terminal of a client and a game service platform server. The client terminal drives a game service platform associated with a plurality of games and provides a game group creation request and a ranking inquiry request through the game service platform. The game service platform server includes a group ranking management module to create, in response to the game group creation request received from the client terminal, the game group including a client and at least one member among members having joined a game service. The group ranking management module is configured to calculate a ranking of the client with respect to other members of the created game group in response to the ranking inquiry request received from the client terminal, and to provide the client terminal with the calculated ranking of the client. The game group creation request includes at least one piece of tag information mapped to the created game group.

An exemplary embodiment also discloses a non-transitory computer-readable medium including an executable program which, when executed, performs a method of providing a ranking of a game group. The method includes creating, in response to a game group creation request received from a client terminal of a client, a game group comprising the client and at least one member among registered friends of the client having joined a game service. The method further includes calculating a ranking of the client with respect to other members of the created game group in response to a ranking inquiry request received from the client terminal, and providing the client terminal with the calculated ranking of the client. The client terminal drives a game service platform associated with a plurality of games and provides the game group creation request and the ranking inquiry request through the game service platform.

An exemplary embodiment also discloses a method performed by a game service platform server including a group ranking management module to provide a ranking of a game group. The method includes creating, in response to a game group creation request received from a client terminal of a client, a game group including the client and a member of at least one game service among a plurality of game services associated with the game service platform, and receiving a request for executing a game service associated with the game service platform from the client terminal. The method further includes calculating, in response to receiving the request for execution from the client terminal, user ranking information for the member having installed the game service, and providing the client terminal with the calculated ranking information of the client. The game service platform is accessible through the game service associated with the game service platform server.

An exemplary embodiment further discloses a method performed by a game service platform server including a group ranking management module to provide a ranking of a game group. The method includes creating, in response to a game group creation request received from a client terminal of a client, a game group including the client and a member of at least one game service among a plurality of game services associated with the game service platform. The method further includes calculating a ranking of the client with respect to other members of the created game group in response to a ranking inquiry request received from the client terminal, and providing the client terminal with the calculated ranking information of the client. The calculating the ranking of the client includes calculating the ranking of the client based on a game score integrated from a plurality of games associated with the game service platform.

An exemplary embodiment also discloses a method performed by a game service platform server including a group ranking management module to provide a ranking of a game group. The method includes creating, in response to a game group creation request received from a client terminal of a client, a game group including the client and members of at least one game service among a plurality of game services associated with the game service platform, and determining whether the plurality of game services associated with the game service platform is installed in terminals of the members of the created game group in response to a game group inquiry request received from the client terminal. The method further includes transmitting a result of the determination to the client terminal, calculating ranking information of the client with respect to members having installed a game service selected by the client among the members of the created game group, if the client selects one of the game services displayed on the client terminal, and providing the client terminal with the calculated ranking information of the client. The game service platform is accessible through the game service associated with the game service platform server.

An exemplary embodiment further discloses a method for providing a game ranking in a game service platform system, the game service platform system including a game service platform server providing a plurality of games in association with a plurality of game server, a user device of a user, and a game server providing one of the plurality of games, the method being performed by the game service platform server. The method includes: receiving a service request over a communication network to access a game service from the first user device, wherein the service request is associated with account information of a social network service (SNS) subscribed to by the first user; inquiring an acquaintance list, which contains SNS acquaintances of the first user for the SNS, to determine whether any SNS acquaintances of the user have joined the game service; registering, automatically, an SNS acquaintance in the SNS acquaintance list as a game friend of the first user in response to determining that the SNS acquaintance has joined the game service; and transmitting SNS acquaintance status information indicating whether each of the SNS acquaintance has joined the game service or not to the user device, The user device displays ranking of the automatically registered game friend. The user device distinguishes an SNS acquaintance who has joined the game service and an SNS acquaintance who has not joined the game service using the SNS acquaintance status information.

An exemplary embodiment also discloses a method performed by a game service platform server of a game service platform system to provide ranking of users. The game service platform server system includes a game service platform server providing a game service platform, a user device of a user and a game server providing a game in association with the game service platform server. The method includes: receiving, from the first user device, a request to access the game service platform server using an account associated to a social network service (SNS) subscribed by the user; determining whether the user is a subscriber of the game service platform; authorizing execution of a game service platform software installed on the user device and transmitting, to the user device, a game list including at least one game provided by the game service platform in response to the user being determined as a subscriber of the game service platform; inquiring an acquaintance list, which contains SNS acquaintances of the first user for the SNS, to determine whether the SNS acquaintances of the user has joined the game service; registering, automatically, an SNS acquaintance in the SNS acquaintance list as a game friend of the first user in response to the SNS acquaintance has joined the game service; and transmitting SNS acquaintance status information indicating whether each of the SNS acquaintance has joined the game service or not to the user device. The user device displays ranking of the automatically registered game friend. The user device distinguishes an SNS acquaintance who has joined the game service and an SNS acquaintance who has not joined the game service using the SNS acquaintance status information.

An exemplary embodiment discloses a method of registering a friend in a game, performed by a game service platform server, the method including: registering, by the game service platform server, one member as a game friend among members who have joined the game managed by the game service platform server, based on friend registration request information received from a user terminal; providing the user terminal with information on the game currently accessed by the member registered as a friend; and providing the user terminal with information needed to execute the game, if game selection information indicating that the game friend has selected the currently accessed game is received from the user terminal, wherein the user terminal executes a game service platform which manages the game and provides the friend registration request information and the game selection information through the game service platform.

An exemplary embodiment also discloses a system for registering a friend in a game, the system including: a user terminal configured to execute a game service platform which manages the game and providing friend registration request information and game selection information through the game service platform; and a game service platform server configured to register at least a member as a game friend among members who have joined the game managed by the game service platform server, based on the friend registration request information received from the user terminal; to provide the user terminal with information on the game currently accessed by the member registered as a friend; and to provide the user terminal with information needed to execute the game, in response to a receipt of the game selection information indicating that the game friend has selected the currently accessed game from the user terminal.

An exemplary embodiment also discloses a method of executing a game through registration of a friend, performed by a game service platform server managing a plurality of games, the method including: receiving a request for registering a game friend based on an address book from a user terminal; searching for address book data stored in the user terminal; determining, by the game service platform server, whether or not a search target registered in the searched address book data has joined at least a game service among the plurality of games managed by the game service platform server; and registering the search target as the game friend, in response to the determination that the search target has joined the game service.

An exemplary embodiment also discloses a method of executing a game through registration of a friend, performed by a game service platform server managing a plurality of games, the method including: receiving a request for adding a rival friend from a user terminal; extracting information, by the game service platform server, on at least one recommendable member matched to conditions of a recommendation algorithm previously agreed with the user, from the members who have joined at least a game service among the plurality of games managed by the game service platform server, and providing the user terminal with the information on recommendable members; and in response to a selection of a member from the provided member information, registering the selected member as the game friend.

An exemplary embodiment further discloses a method for providing a game ranking in a game service platform system, the game service platform system including a game service platform server providing a plurality of games in association with a game server, a first user device of a first user, and a game server providing one of the plurality of games, the method being performed by the game service platform server. The method includes receiving a service request over a communication network to access a game service from the first user device, wherein the service request is associated with account information of a social network service (SNS) subscribed by the first user, inquiring an acquaintance list, which contains SNS acquaintances of the first user for the SNS, to determine whether the SNS acquaintances of the first user has joined the game service, registering, automatically, an SNS acquaintance in the SNS acquaintance list as a game friend of the first user in response to the SNS acquaintance has joined the game service, and transmitting SNS acquaintance status information indicating whether each of the SNS acquaintance has joined the game service or not to the first user device, wherein the first user device displays ranking of the automatically registered game friend, and wherein the first user device provides a user interface to distinguish, using the SNS acquaintance status information, an SNS acquaintance who has joined the game service and an SNS acquaintance who has not joined the game service using the SNS acquaintance status information.

An embodiment also discloses a method performed by a game service platform server of a game service platform system to provide ranking of users, the game service platform server system including a game service platform server providing a game service platform, a first user device of a first user, and a game server providing a game in association with the game service platform server. The method includes receiving, from the first user device, a request to access the game service platform server, determining whether the first user is a subscriber of the game service platform, authorizing execution of a game service platform software installed on the first user device and transmitting, to the first user device, a game list including a game service provided by the game service platform in response to the first user being determined as a subscriber of the game service platform. The method further includes inquiring an acquaintance list, which contains social network service (SNS) acquaintances of the first user for the SNS, to determine whether the SNS acquaintances of the first user have joined the game service, registering, automatically, an SNS acquaintance in the SNS acquaintance list as a game friend of the first user in response to a determination that the SNS acquaintance has joined the game service, transmitting SNS acquaintance status information indicating whether each of the SNS acquaintance has joined the game service or not to the first user device, and wherein the first user device displays ranking, for the game service, of the automatically registered game friend, wherein the first user device provides a user interface to distinguish, using the SNS acquaintance status information, an SNS acquaintance who has joined the game service and an SNS acquaintance who has not joined the game service using the SNS acquaintance status information.

An exemplary embodiment further discloses a method performed by a game service platform server of a game service platform system, the game service platform server system including a game service platform server providing a game service platform, a first user device of a first user and a game server providing a game in association with the game service platform server. The method includes providing a game list including a plurality of games for the first user device; receiving a signal of the first user selecting, a game among the plurality of games, inquiring an acquaintance list, which contains social network service (SNS) acquaintances of the first user for the SNS, to determine whether the SNS acquaintances of the first user has joined the game service, registering, automatically, an SNS acquaintance in the SNS acquaintance list as a game friend of the first user in response to the SNS acquaintance has joined the game service, and providing the first user device with a game friend list including the game friend, wherein the first user device provides a user interface to distinguish an SNS acquaintance who has joined the game service and an SNS acquaintance who has not joined the game service using the SNS acquaintance status information using the game friend list.

In further embodiments, the method may further include transmitting an invitation message to the SNS acquaintance who has not joined the game service in response to a request from the first user device, and/or the invitation message may include a direct link to a page for installation of the game.

An exemplary embodiment discloses a non-transitory computer-readable storage medium having computer-executable instructions executed by a user device of a user. The instructions perform at least processes of displaying a game service platform interface providing at least one game the user can select, executing a game software, in response to the user selection to access a game server for the executed game software, inquiring an acquaintance list, which contains SNS acquaintances of the user for the SNS, including SNS acquaintance status information indicating whether each of the SNS acquaintance has joined the game service or not to the first user device, and transmitting an invitation message, through the game service platform server, to an SNS acquaintance user who have not joined the game service, wherein the user device provides a user interface to distinguish an SNS acquaintance who has joined the game service and an SNS acquaintance who has not joined the game service using the SNS acquaintance status information.

Further embodiments may include non-transitory computer-readable storage media wherein the invitation message includes a link directly connecting to a page for installation of the game service, and/or wherein accessing the game service platform is based on an account information of a social network service.

An exemplary embodiment also discloses a method for managing acquaintance information in association with an application, which provides a service dedicated to the application in association with a social network service (SNS) using the acquaintance information. The method performed by an SNS server providing the SNS includes receiving from a first user device a request for the service, wherein a first user of the first user device is registered on the SNS, and the request for the service is submitted using an account of the first user for the SNS service, determining, in response to the request for the service, whether the application is installed on a second user device, wherein a second user of the second user device is registered as an acquaintance of the first user for the SNS, and transmitting to the first user device a list of acquaintances in order that the application uses the list of acquaintances for the service, wherein the application displays, on the first user device, the second user, in response to determination that the application has been installed on the second user device, as an application friend of the first user using the list of acquaintances for the service.

An exemplary embodiment further discloses a non-transitory computer-readable storage medium having computer-executable instructions executed by a first user device of a first user. The instructions perform at least processes of executing an application in response to a selection by the first user, wherein the application provides a service dedicated to the application in association with a social network service (SNS), inquiring an acquaintance list, which contains SNS acquaintances of the first user for the SNS, including SNS acquaintance status information indicating whether each of the SNS acquaintance has joined the game service or not to the first user device, and registering, automatically, an SNS acquaintance, in response to determination that the application has been installed on a second user device of the SNS acquaintance, as an application friend of the first user using the list of acquaintances for the service.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 22 is a view showing an information storage table for providing a group ranking for each user according to an exemplary embodiment.

DETAILED DESCRIPTION OF THE ILLUSTRATED EMBODIMENTS

Figure 1A:
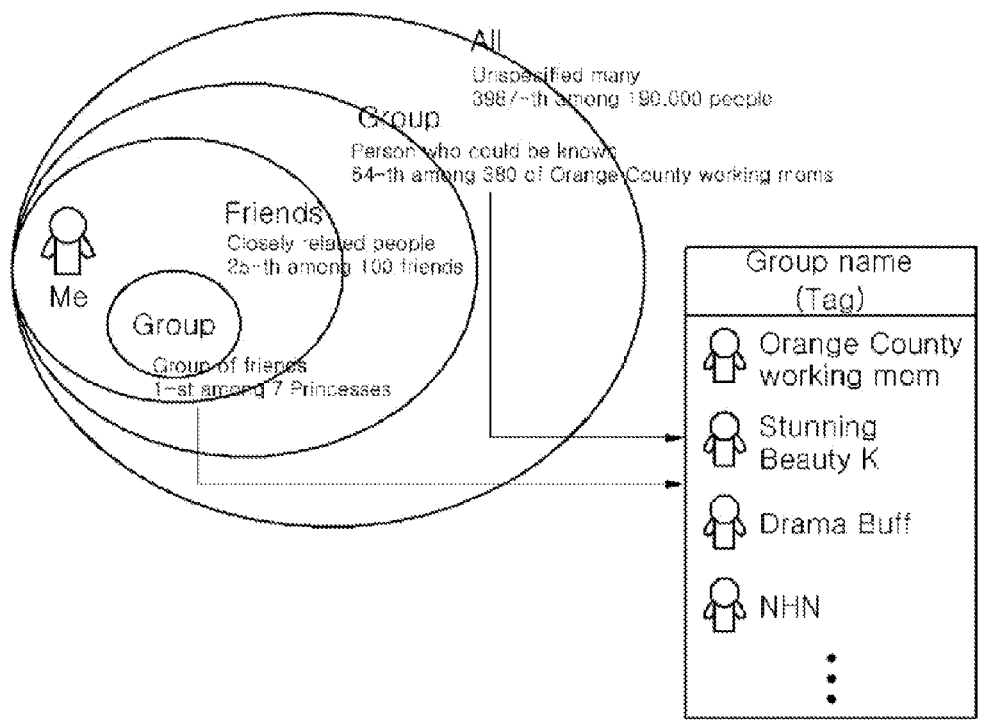
FIG. 1A is a view showing the concept of creating a group according to an exemplary embodiment.

The invention is described more fully hereinafter with reference to the accompanying drawings, in which exemplary embodiments are shown. This inventive concept may, however, be embodied in many different forms and should not be construed as limited to the embodiments set forth herein. Rather, these embodiments are provided so that this disclosure is thorough, and will fully convey the scope of the inventive concept to those skilled in the art. In the drawings, the size and relative sizes of layers and regions may be exaggerated for clarity. Like reference numerals in the drawings denote like elements.

The terminology used herein is for the purpose of describing particular embodiments only and is not intended to be limiting of the invention. As used herein, the singular forms, "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. It should be understood that for the purposes of this disclosure, "at least one of X, Y, and Z" can be construed as X only, Y only, Z only, or any combination of two or more items X, Y, and Z (e.g., XYZ, XYY, YZ, ZZ).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A user may create a group by setting a specific tag (or keyword), and each user may search for a group among created groups and join the searched group.

When a group is created, qualifications for joining the corresponding group can be set, and when a user joins the group, approval of joining the group can be determined by automatically examining the joining qualifications, or can be determined with the approval of a group creator or a service server.

The group can be created as a small group within the user's game friends registered by the user or can be created using a specific tag, targeting all the users joining a game service as members.

Exemplary embodiments further may include a method and a system for registering a friend in a game, in which users playing a game provided through a user terminal device are registered as a friend, and a game community is created based on the registered friends.

In an exemplary embodiment, a game service platform associated with a plurality of games is provided, and a game friend can be registered in a variety of methods through the provided game service platform. Accordingly, a game accessing state of a friend can be confirmed in real-time using information on the registered game friend, and thus the user may immediately participate in the game currently executed by the game friend.

In addition, according to an exemplary embodiment, a game friend appropriate for the user can be recommended through the provided game service platform, and the user may select and register the recommended friend as a user's game friend or participate in the game currently executed by the recommended friend.

The exemplary embodiments are described below with respect to a "smart phone" for the clarity of explanation. However, exemplary embodiments can be applied to any user terminal device that can provide the functions of the exemplary embodiments, as well as a smart phone. For example, the exemplary embodiments may be applied to all kinds of user terminal devices capable of executing an application, including not only mobile terminals such as a laptop computer, a digital broadcasting terminal, a personal digital assistant (PDA), a portable multimedia player (PMP), and a navigation device, as well as cellular phone, but also fixed terminals such as a computer, and a TV.

"Game service platform" may refer to a software framework (including an application program framework) which provides integrated management of information and services related to each game in association with at least a game program (preferably, a plurality of game programs). For example, the game service platform may be a basis for executing individual game software, and the execution of a program may not be restricted to a specific operating system through the game service platform.

"Acquaintance" may refer to a person with whom a client terminal device user executing the game service platform establishes a relation through a certain channel (for example, stores the person in the address book of the client terminal device, or registers the person in a social network service (SNS) as a friend), and the connection relation is stored in computer-readable memory. 'Non-acquaintance' may refer to the opposite of "acquaintance." For example, a "non-acquaintance" may be a person with whom a relation with the client terminal device user (e.g., user) executing the game service platform has not been established through any channel, and/or the connection relation has not been stored in the computer-readable memory. The acquaintance and the non-acquaintance may be distinguished and separately registered as game friends through different methods.

In addition, the game service platform may be integrated in a smart phone, may manage a plurality of game software in an integrated manner, and may provide a variety of services in association with each game software. For example, the game service platform may provide an interface allowing each user to access each game, as well as a variety of records and statistical data related to the game. The game service platform may also provide a function for creating a group and provide information on rankings in each group and rankings among groups, calculated for the created groups through the smart phone.

"Ranking" may refer to a ranking for points or scores obtained in a game, and, in some cases, may be a ranking for points assigned to each round of a specific game or a ranking for total points integrated by the game service platform.

Hereinafter, exemplary embodiments of the invention will be described in detail with reference to the accompanying drawings so that those skilled in the art may easily understand the invention.

A game service platform manages information on each game in association with a plurality of games, provides a function for creating a group, and calculates and provides a ranking of each group. A method for providing a ranking may be implemented within each game program without separately installing the game service platform in a smart phone, and the method may be implemented on the game service platform to create a group, provide a ranking of the created group, and provide an integrated ranking of the plurality of games.

Creating a Group

FIG. 1A is a view showing how a user may create a group according to exemplary embodiments of the present invention. Referring to FIG. 1A, a game service user may register game friends by a variety of methods in relation to a game service. The registration methods include, but are not limited to, automatically adding a friend from the user's address book, automatically adding a social network service (SNS) friend, searching for and adding a person who registered the game service user as a friend, searching for and adding a friend using an identity (ID)/nickname, or adding a person from a list provided through a user information window or recommendation of non-acquaintances. The user may create a group within the registered game friends (e.g., acquaintances) or among all game service users (e.g., all the users without distinguishing acquaintances and non-acquaintances).

When a group is created with respect to all the game service users, tags (e.g., Orange County working mom, Stunning Beauty K, Drama Buff, or NUN) are designated to the group, and the group may be created according to each of the tags. If the group is created in this way, some of all the service users may join the group, thereby creating the group.

If a specific group is created within game friends or among all the game service users, a ranking of a user within the group or a ranking among the groups is calculated, and information on the calculated ranking may be provided to each service user within each game program, or preferably through the game service platform which will be described later.

Game Service Platform

Figure 1B:
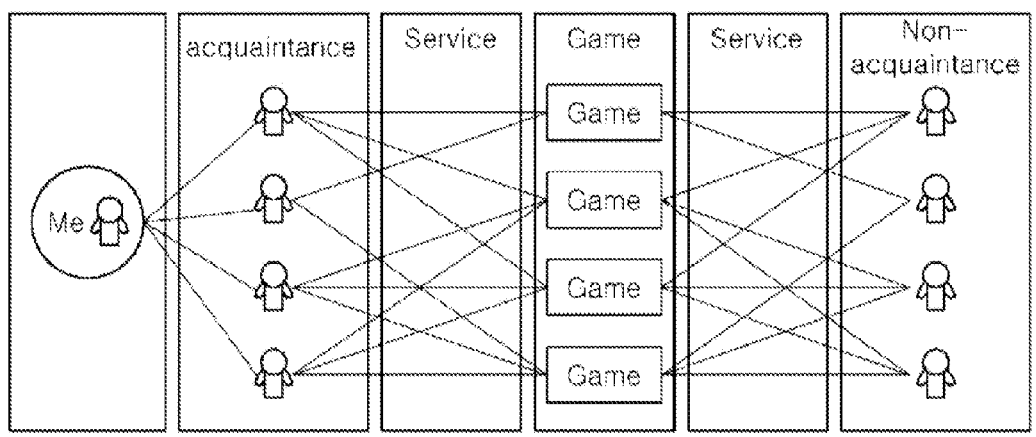
FIG. 1B is a view showing the concept of a game service platform according to an exemplary embodiment.

FIG. 1B is a view showing a game service platform according to an exemplary embodiment. Referring to FIG. 1B, the game service platform supporting the registration of friends and the ranking providing system may allow a user to easily create a group by registering a game friend or tag, and may provide a basis for easily joining a group and providing a ranking of each group.

For example, a user may register his or her acquaintances as game friends and may create a small group within the corresponding game friends, or may create a group by setting a tag and form a group with respect to all game service members (non-acquaintances). In addition, a ranking within a social network service (SNS) group which the user has joined or a ranking among the groups may be provided.

In addition, effective ranking information may be provided through the interconnection between an individual game and the game service platform. For example, structural flexibility may be secured by providing ranking information of an individual game within the game and/or switching the ranking information to a screen of the game service platform using a ranking interface customized within the game.

Accordingly, meaningful rankings within a created game group may be provided by providing the ranking information through the game service platform. A sense of belonging and solidarity of a community may be obtained by comparing the rankings among the groups.

The game service platform according to another exemplary embodiment provides a basis for a service user to easily access a game through an acquaintance and further easily make friends with a non-acquaintance through the game. That is, the service user may register his or her acquaintance as a friend, and may access a game played by an acquaintance through the registered game friend or play the game together with the acquaintance. In addition, the service user may establish a social network based on a specific game by playing the game together with a non-acquaintance who has an access to the game or registering the non-acquaintance who has played the game together with the user as a game friend.

Accordingly, since the service user, the service, and the game are closely interconnected through the game service platform according to an exemplary embodiment, the relationship with the service users is extended, thereby enhancing amusement. Furthermore, game-oriented services that will keep experiences and values can be provided through the game service platform according to an exemplary embodiment of the present invention.

Figure 2:
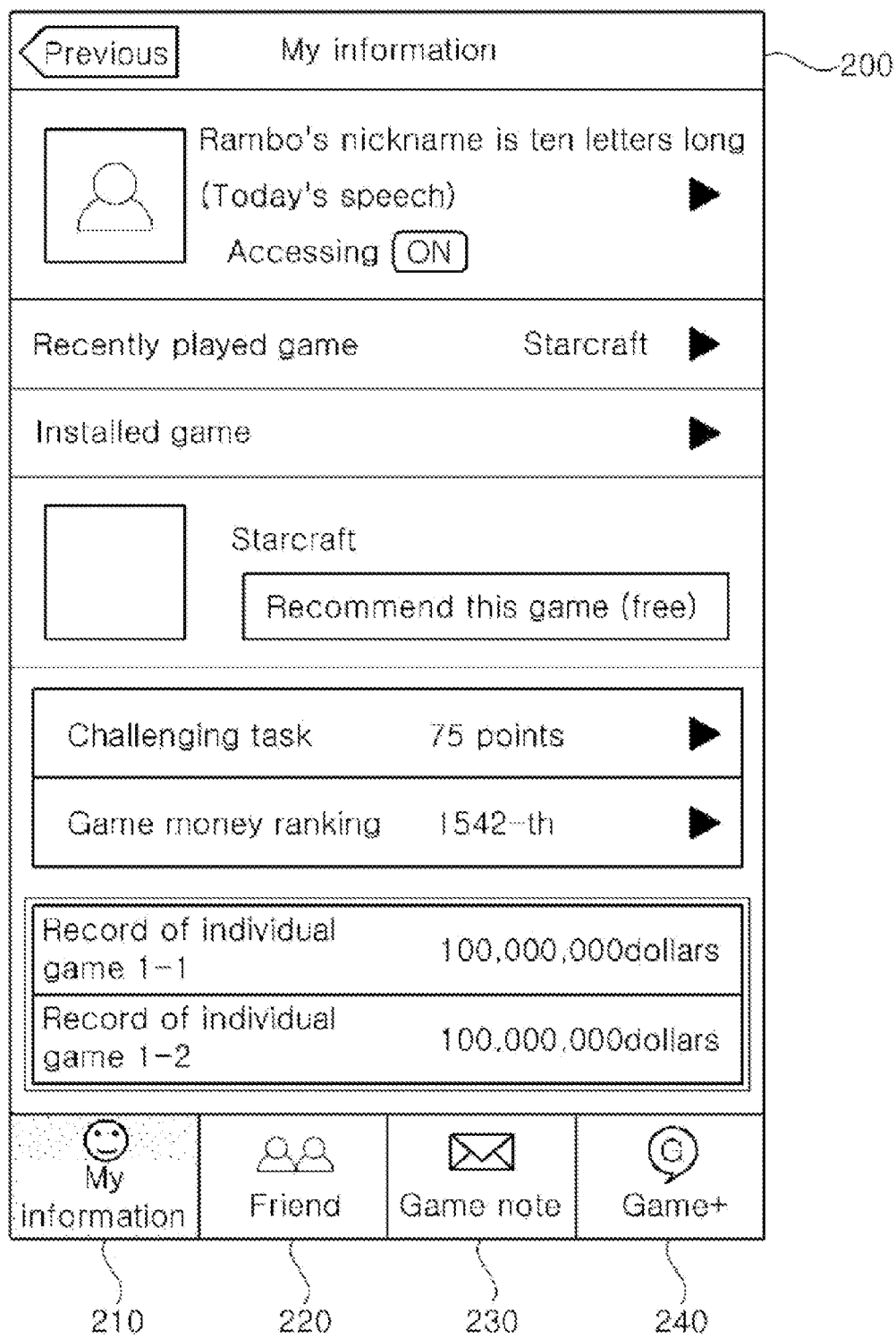
FIG. 2 is a view showing a screen of a game service platform on a smart phone according to an exemplary embodiment.

FIG. 2 is a view showing a screen of a game service platform on a smart phone according to an exemplary embodiment of the present invention. As shown in FIG. 2, the screen 200 of the game service platform, provided by a smart phone, includes a variety of menus and information related to a game, and specific items of each menu may operate in connection with a plurality of games associated with the game service platform.

The main menu provided by the game service platform may include entries such as My Information 210, Friend 220, Game Note 230, Game Plus (Game+) 240 and the like at the lower portion of the screen. If the My Information 210 is selected from the main menu, the screen is switched to the home of the My Information 210, and a variety of information on a corresponding user who has joined a smart phone game service is displayed as shown in FIG. 2. For example, information such as a picture, a nickname, a connection state, recently played games, installed games, game titles, recommendation of this game, challenging tasks, a representative ranking, and records of each game can be displayed.

At this point, if a specific item is selected from the items listed above, a connected page for detailed information view or detailed selection is displayed. For example, if an arrow displayed on the right side of the nickname 'Rambo's nickname is ten letters long' at the upper portion is selected, the screen is switched to display a profile management screen that allows management of detailed information on a corresponding user, and the picture, the nickname or the like can be modified, or an SNS account such as Facebook™ can be registered through the switched profile management screen. In addition, an automatic login function can be set or released.

On the other hand, if the entry Friend 220 is selected from the main menu, a function of extracting a variety of information on acquaintances and recommending non-acquaintances is provided as shown in FIG. 11, FIG. 12, FIG. 13, FIG. 14, FIG. 15, and FIG. 16, which will be described below. Detailed descriptions thereof will be described below.

If the entry Game Note 230 is selected from the main menu, a function of sending a note to other registered game service users is performed.

Finally, if the entry Game Plus 240 is selected from the main menu, information on a variety of games associated with the game service platform is provided, and information such as a game advertisement banner, a game mobile web link, and a customer center can be additionally provided.

Hereinafter, a system according to an exemplary embodiment of the present invention and various components thereof will be described in detail with reference to FIG. 3 and FIG. 4, and then, procedures of recommending a friend and executing a game according to exemplary embodiments of the present invention will be described in detail with reference to FIG. 5, FIG. 6, FIG. 7, FIG. 8, FIG. 9, and FIG. 10.

General System Configuration

Figure 3:
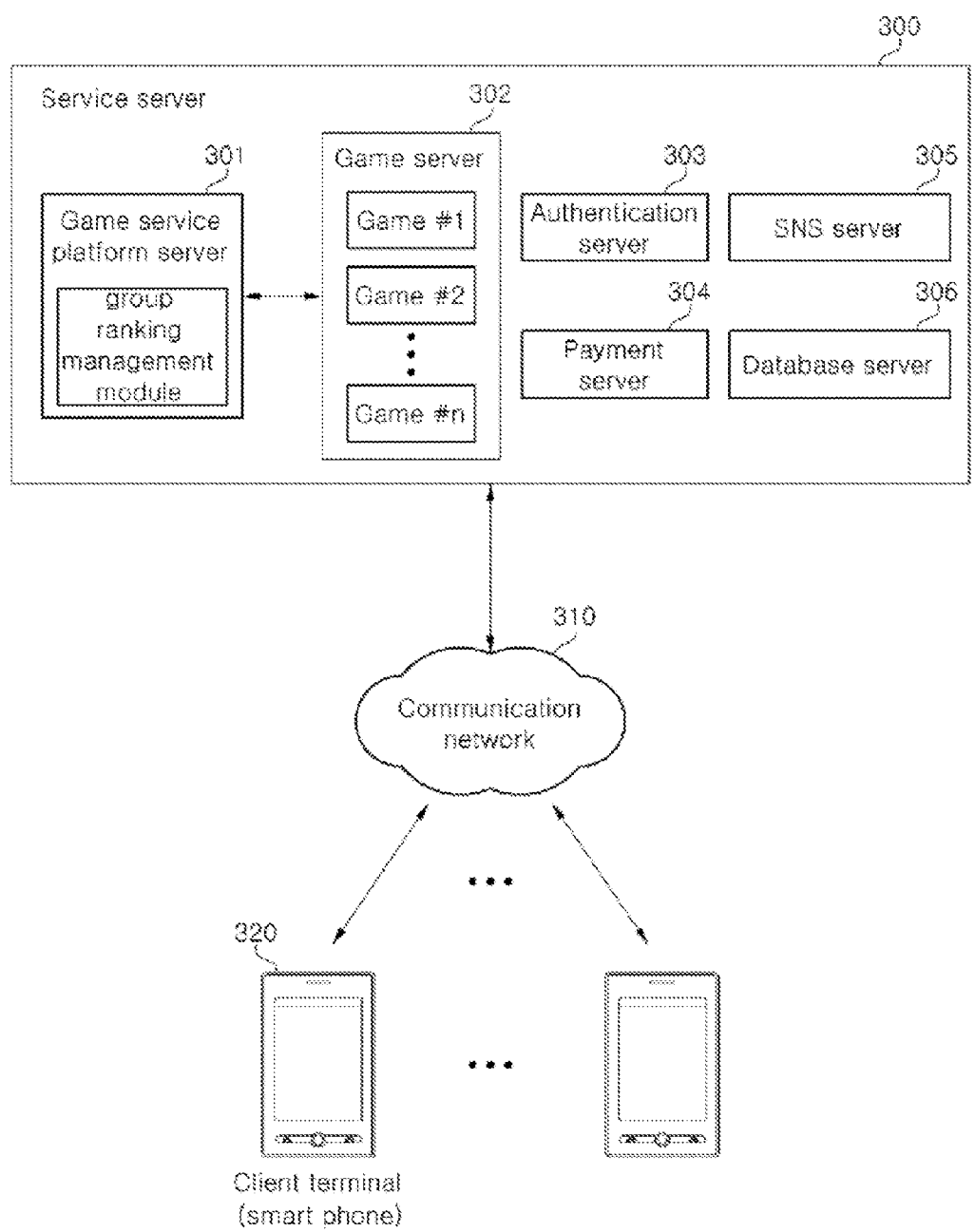
FIG. 3 is a view showing a system for registering a friend and providing ranking information through a game service platform according to an exemplary embodiment.

FIG. 3 is a view showing a system for registering a friend and providing a ranking in a game according to an exemplary embodiment.

Referring to FIG. 3, a service server 300 of a service provider may be connected to a plurality of client terminals (e.g., smart phones) 320 in which a game service platform is executed through a communication network 310. The service server 300 may include a game service platform server 301, a game server 302, an authentication server 303, a payment server 304, an SNS server 305, and a database server 306. The game server 302 may separately perform a function for individual games so that a plurality of games may be driven through each of the client terminals 320.

The communication network 310 can be configured through a wired or wireless communication and/or through short range communications (e.g., Infrared Data Association (IrDA), Bluetooth), and can be configured through a variety of communication networks such as a personal area network (PAN), a local area network (LAN), a metropolitan area network (MAN), and a wide area network (WAN). In addition, the communication network may be a well-known world wide web (WWW) or may use a wireless transmission technique used for short range communications, such as the Infrared Data Association (IrDA) or Bluetooth™.

The game service platform server 301 may be associated with the game server 302 and may provide each of the client terminals 320 with the game service platform. The game service platform server 301 may create a group and provide important functions for providing a ranking within the created group or a ranking among the groups. Detailed functions of the game service platform server 301 will be described below with reference to FIG. 4.

The game server 302 may provide the client terminals 320 with programs or information related to each game in order to provide a user with a variety of games. The user may download a game application from the game server 302, and install and execute the game application in the client terminal 320. For example, the game server 302 may install the game application if the game application is not installed in the client terminal 320 and may update the game application to a newer version if the game application on the client terminal 320 is an old version. In some cases, a game application may be downloaded from a dedicated download server (not shown) or the game service platform server 301, and not from the game server 302.

The game server 302 may share ranking information with the game service platform server 301, provide ranking information of each game, and be associated with the game service platform server 301 through a ranking interface customized for each game.

The authentication server 303 may perform authentication for each client terminal 320 on connection to the game service platform server 301 and/or on execution of a game on each client terminal 320. The game service platform server 301 or the game server 302 may provide the client terminal 320 with a variety of corresponding services depending on a result of the authentication.

The game server 302 may calculate a user's elapsed time and a time limit of a game and provide the client terminal 320 with a result thereof through communications with the client terminal 320. The game server 302 may implement a free trial allowing the user to enjoy a game for free for a certain period of time set by the game producers or by default by the game server 302 or may implement a function allowing the user to play the game only at a predetermined time on a time basis rate also set by the game producers or by default by the game server 302. If a specific game is a pay game for which a user is charged, the game may be provided after a payment is made through the payment server 304. In addition, the authentication server 303 may continuously communicate with servers 301 and/or 302 while the game is in progress to maintain the game, and thus the game server 302 may determine whether or not the network connection is maintained through communications with the client terminal 320.

The SNS server 305 may provide social network services (SNS) (e.g., Facebook® service) of a service provider, and may provide ranking information within an SNS group through the game service platform server 301 by providing the game service platform server 301 with information on members.

In some cases, the SNS server 305 may be operated by the same company of the game service platform server 301, and, in some cases, SNS servers may be operated by other companies outside the service server 300.

The database server 306 may store a variety of information needed for providing the client terminal 320 with a game service platform and a plurality of games, and may provide information requested from the game service platform server 301, the game server 302, the authentication server 303, the payment server 304, and/or the SNS server 305. The requested information may include information related to execution of the game service platform, information related to execution of a game application, authentication information including user information, information on records related to a game, and/or ranking information.

The information related to the execution of a game application may include information needed for executing the game application, such as whether or not the game application is downloaded to the client terminal 320, a version of the game, and an Internet protocol address of the game server 302. The authentication information containing user information may include user unique information for determining whether or not a valid user is executing the game, terminal unique information for determining whether or not the game is executed at an authenticated client terminal 320. The information on the game may include information such as identification, a nickname, an avatar, an age, a sex, a grade, a game result, a ranking, and/or a score of the user; information on whether or not the user has passed a specific stage; information on whether or not the user has accomplished a specific mission; information on whether or not the game is a free trial game; and/or information on a time limit of the game.

Figure 4:
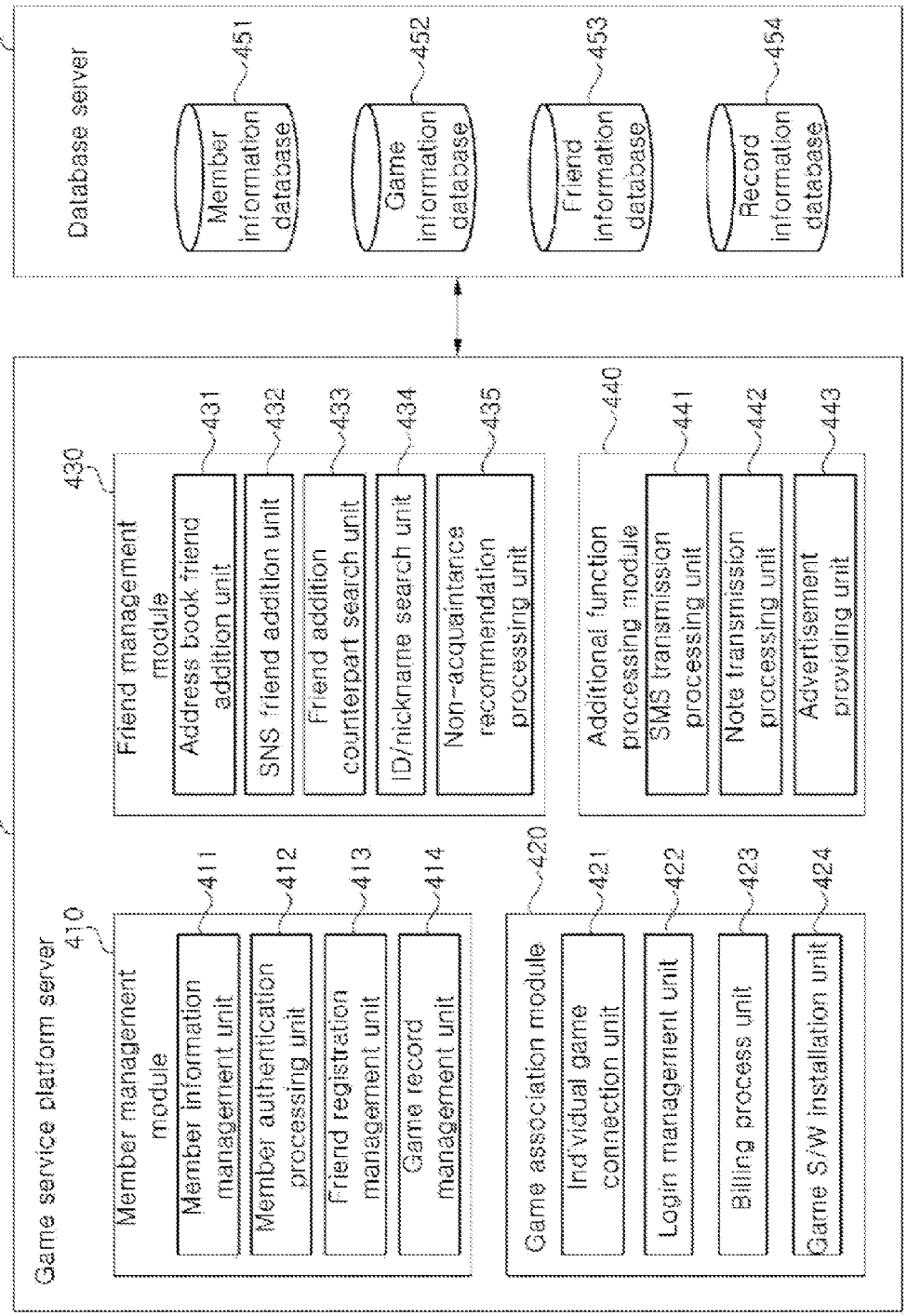
FIG. 4 is a view showing a structure of a game service platform server and a database server according to an exemplary embodiment.

The database server 306 may include a plurality of databases as shown in FIG. 4, and a database containing a portion or all of the databases' information may be stored in the client terminal 320.

In addition, a group ranking management module for managing a mission or a score accomplished by the user in a game may be included in the game service platform server 301 or the game server 302. The database server 306 may further include information related to the group ranking management module. Although FIG. 3 illustrates the service server 300 including six servers 301, 302, 303, 304, 305, and 306, the six servers may be functionally integrated or separated. In addition, some servers having additional functions may be further included as described above, and thus the service server 300 may include one or more servers, rather than six servers.

The client terminal 320 may include an input-output function for communicating with the service server 300 through the communication network 310 so that a user may execute a game service platform or a variety of games. The client terminal 320 may be any kind of digital device provided with a memory means and connected to a processor to have a processing capability. The client terminal 320 may be a desktop computer, a notebook computer, a workstation, a palmtop computer, a personal digital assistant (PDA), a web pad, or a mobile communication terminal such as a smart phone.

Game Service Platform Server

Referring to FIG. 4, according to an exemplary embodiment, the game service platform server 301 may include a member management module 410, a game association module 420, a friend management module 430, and an additional function processing module 440. In addition, the database server 306 for storing and transmitting a variety of data in association with the game service platform server 301 may include a member information database 451, a game information database 452, a friend information database 453, and a record information database 454.

The member management module 410 manages a variety of personal information registered when a user joins a game service platform or an individual game as a member and particularly manages game records and information on friends registered by each member according to an exemplary embodiment. The game association module 420 allows the game service platform server 301 to operate in association with individual games of the game server 302, and may allow the game service platform to process login and billing of the individual games in an integrated manner. The friend management module 430 provides various functions for adding and recommending game friends according to an exemplary embodiment. The additional function processing module 440 provides a variety of functions that can be additionally provided in relation to addition and recommendation of game friends.

At this point, all or some of detailed function units included in each module 410 to 440 of the game service platform server 301 may also be equally included in a service platform client application installed on the client terminal 320, and some of the detailed function units may be processed in an associated or distributed manner by a server and client system.

Hereinafter, detailed functions of each of the modules will be described in detail.

First, the member management module 410 may include a member information management unit 411, a member authentication processing unit 412, a friend registration management unit 413, and a game record management unit 414. The member information management unit 411 stores a variety of information related to a member inputted when each user accesses the game service platform server 301 and joins a service through the game service platform or updates a variety of information related to the member modified through my information home (see FIG. 2) of the game service platform within the member information database 451.

The member authentication processing unit 412 performs authentication in association with the authentication server 303 when a user who has joined as a member logs in the game service platform or a game. The friend registration management unit 413 performs a function of managing game friends of a member registered in a variety of methods according to an exemplary embodiment. The game record management unit 414 performs a function of managing records of each game or records of all games of a member.

The game association module 420 may include an individual game connection unit 421, a login management unit 422, a billing process unit 423, and a game software (S/W) installation unit 424. The individual game connection unit 421 performs an interface function of allowing a user to access a specific game when the game is selected among a plurality of games provided in the game server 302 that is associated with the game service platform server 301. The login management unit 422 performs a function of processing logging into a game in an integrated manner or individually processing logging into each game when a user accesses the game through the game service platform. The billing process unit 423 performs a function of processing billing in association with the payment server 304 when an accessed specific game is a premium game. The game S/W installation unit 424 performs a function of automatically proceeding to a game S/W installation step and installing a game S/W when a user desires to access a specific game through the game service platform according to an exemplary embodiment and S/W corresponding to the game is not installed on the client terminal 320.

Figure 6:
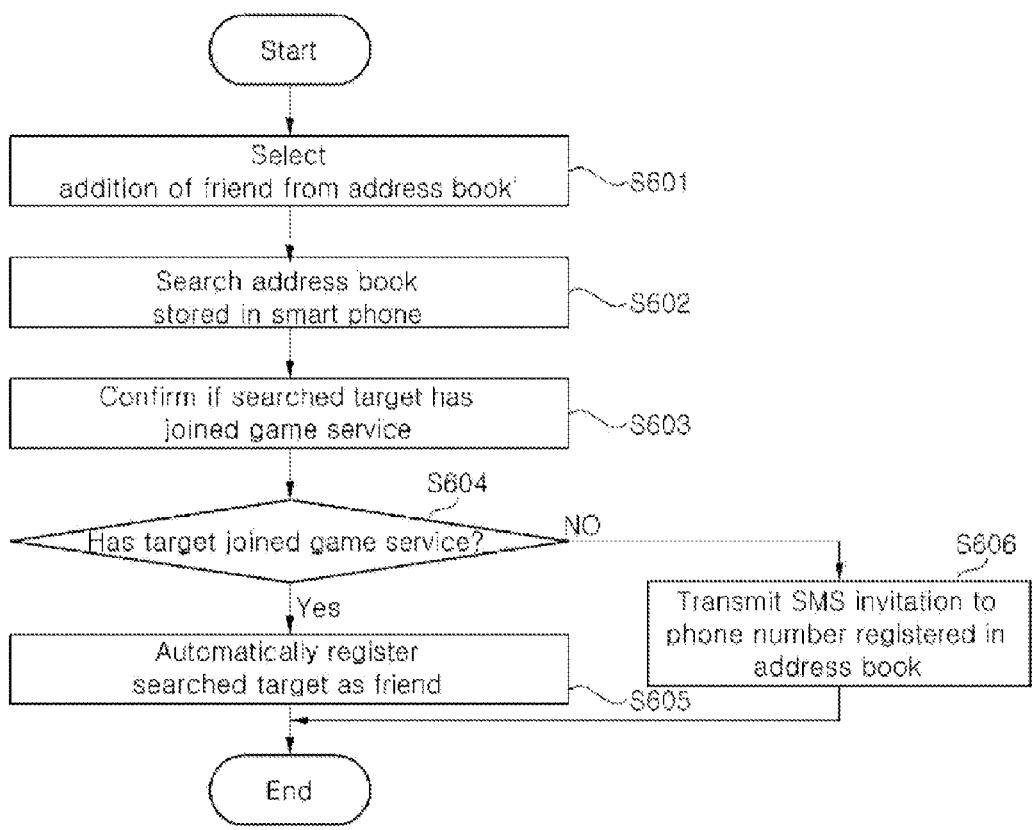
FIG. 6 is a flowchart illustrating a procedure of automatically registering a friend from an address book according to an exemplary embodiment.
Figure 7:
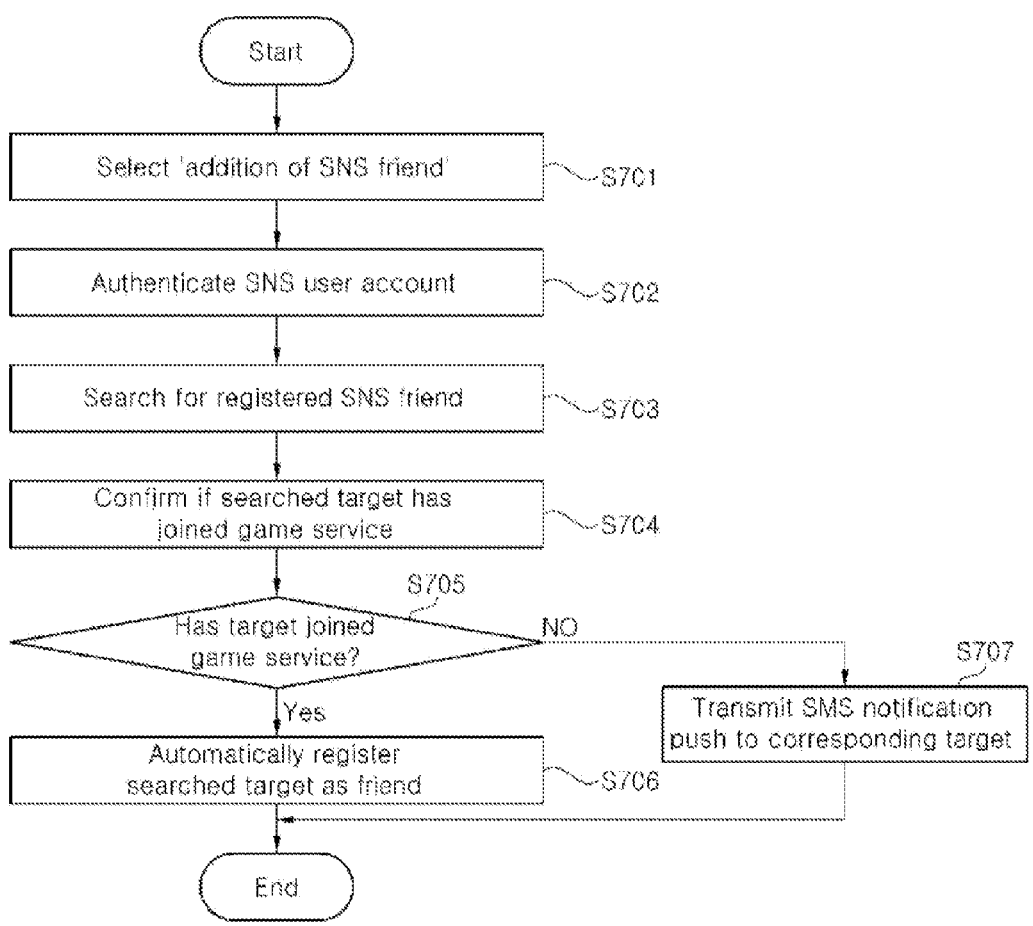
FIG. 7 is a flowchart illustrating a procedure of automatically registering an SNS friend according to an exemplary embodiment.
Figure 8:
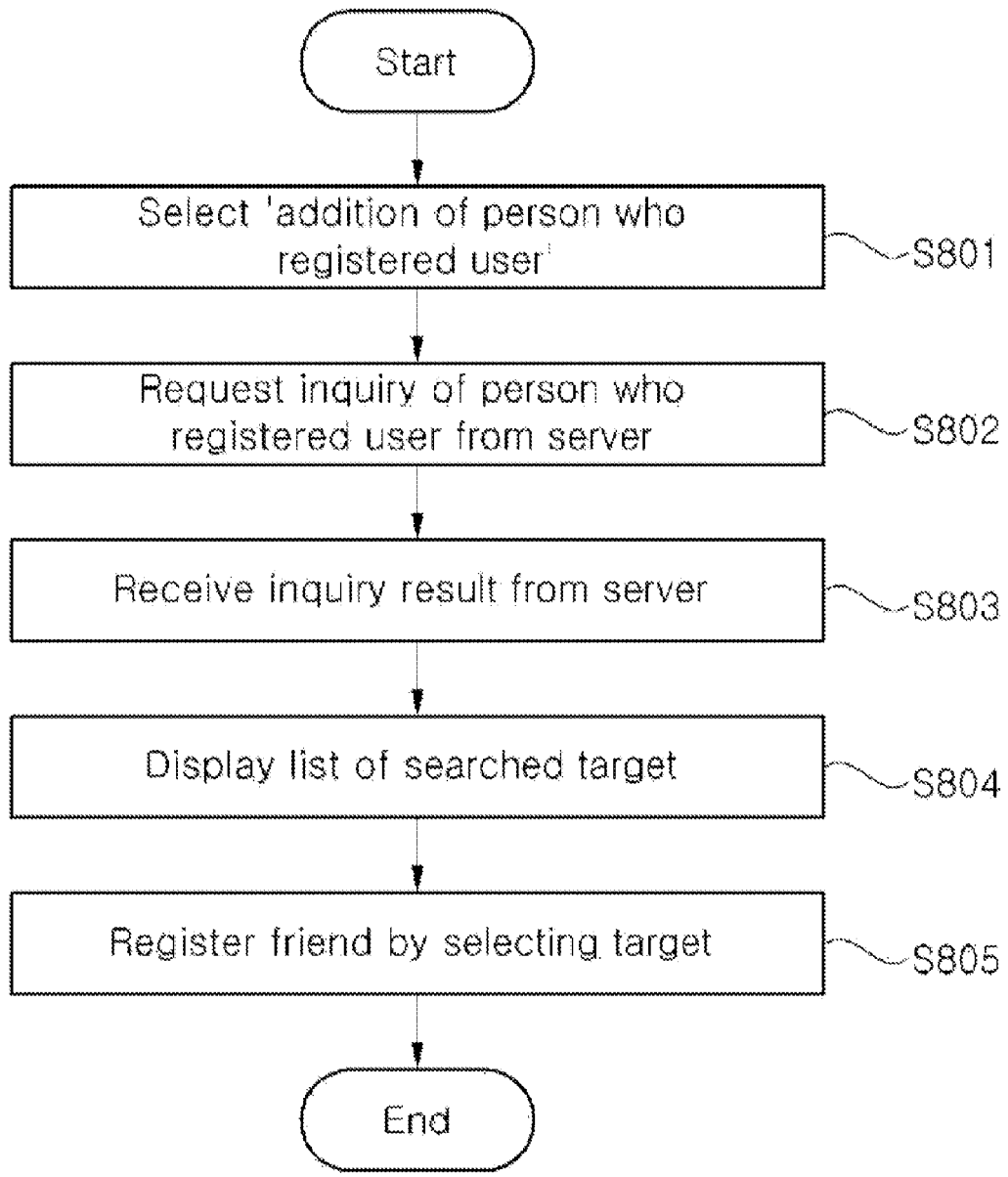
FIG. 8 is a flowchart illustrating a procedure by which a user registers a person, as a friend, who added the user as a friend according to an exemplary embodiment.
Figure 9:
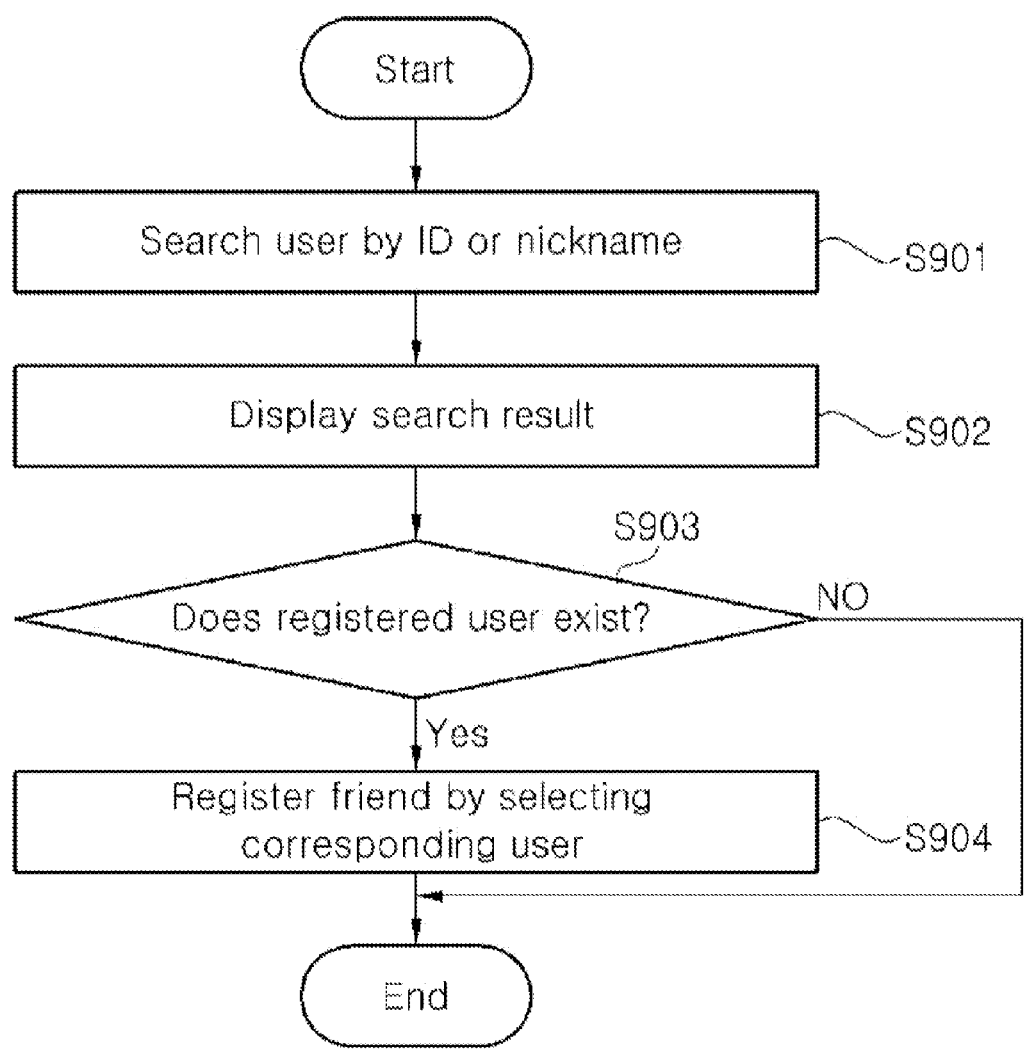
FIG. 9 is a flowchart illustrating a procedure of registering a friend by user search according to an exemplary embodiment.
Figure 10:
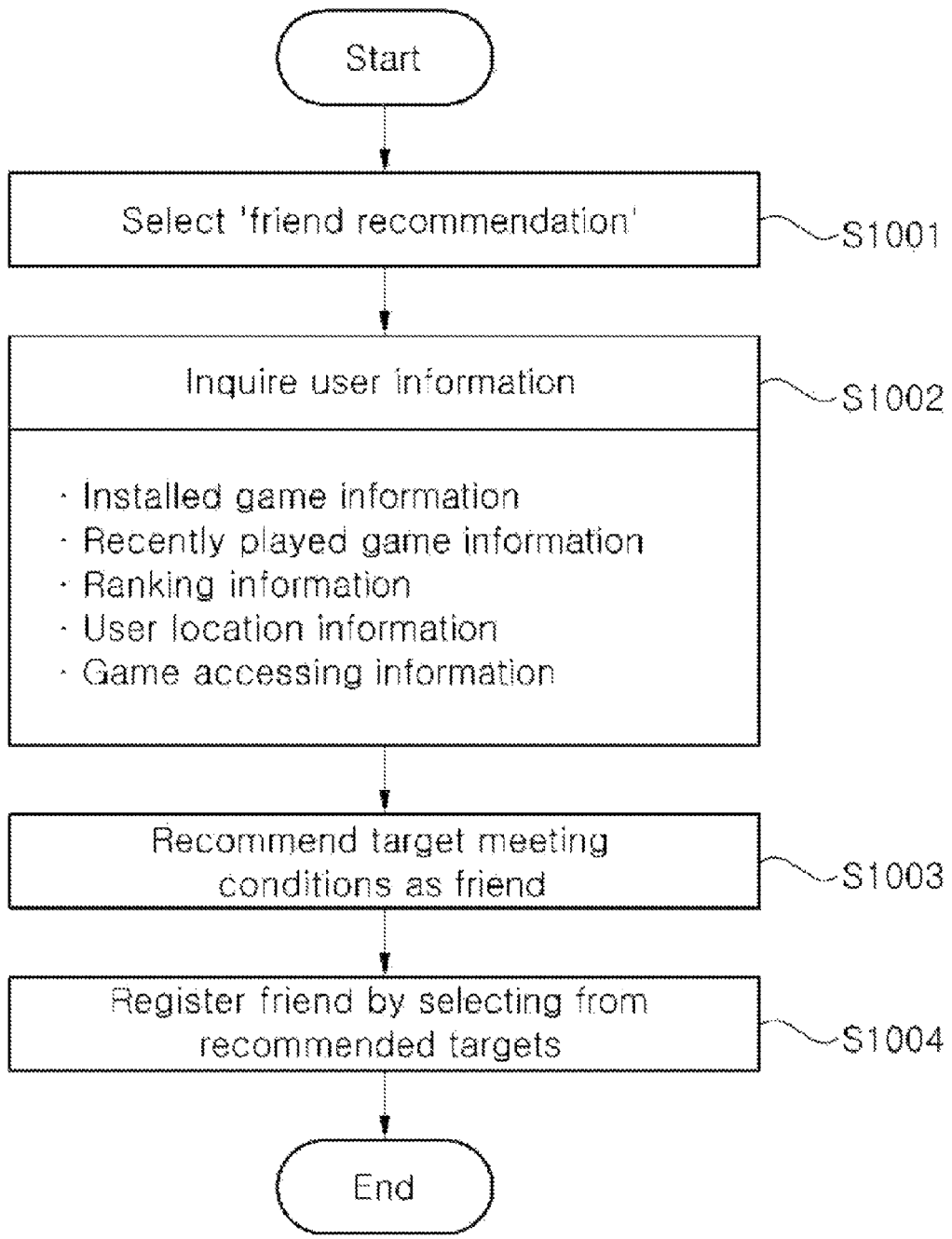
FIG. 10 is a flowchart illustrating a procedure of recommending a friend at a server according to an exemplary embodiment.

The friend management module 430 may include an address book friend addition unit 431, an SNS friend addition unit 432, a friend addition counterpart search unit 433, an ID/nickname search unit 434, and a non-acquaintance recommendation processing unit 435 so as to perform a function according to each exemplary embodiment. The address book friend addition unit 431 performs a function of searching for an address book stored in the client terminal 320 and automatically registering searched acquaintances as game friends as shown in FIG. 6, which will be described below. The SNS friend addition unit 432 performs a function of searching for SNS friends registered by the user of the client terminal 320 from an SNS service such as Facebook™ service where the user has joined and automatically registering the searched SNS friends as game friends as shown in FIG. 7, which will be described below. The friend addition counterpart search unit 433 performs a function of searching for users who have registered the user of the client terminal 320 as a game friend and registering the searched users as game friends as shown in FIG. 8, which will be described below. The ID/nickname search unit 434 performs a function of searching for a user who has joined the game service platform or an individual game as a member using an ID or a nickname and providing a result of the search so as to register the searched user as a game friend as shown in FIG. 9, which will be described below. The non-acquaintance recommendation processing unit 435 performs a function of searching for and recommending non-acquaintances unknown to the user among service members of a game based on a predetermined algorithm (or rules) and registering non-acquaintances selected among the recommended non-acquaintances by the user as game friends as shown in FIG. 10, which will be described below.

In this manner, each function unit of the friend management module 430 provides a function of registering an acquaintance or a non-acquaintance as a game friend or a function of recommending a friend who will play a game together with the user in a variety of methods according to an exemplary embodiment.

The additional function processing module 440 may include an SMS transmission processing unit 441, a note transmission processing unit 442, and an advertisement providing unit 443 in order to provide functions added to the functions of the friend management module 430 or a variety of additional functions provided by the game service platform according to an exemplary embodiment. As shown in FIG. 6, which will be described below, the SMS transmission processing unit 441 performs a function of automatically transmitting an SMS invitation if an acquaintance stored in the address book is not joined a game service or provides a function of transmitting an SMS message to a friend registered by the user while the user performs a variety of functions through the game service platform. Although an exemplary embodiment of the SMS transmission processing unit 441 which transmits an SMS message is described for the convenience of explanation, it would be appreciated that the SMS transmission processing unit 441 may be applied in a variety of ways, such as transmitting an email to an electronic mail address, other than the SMS, depending on an address form of the acquaintance stored in the address book. The note transmission processing unit 442 provides a game note transmission function included in the main menu when the game service platform is executed as shown in FIG. 2. The advertisement providing unit 443 performs a function of providing information or advertisements related to a variety of games associated through the game service platform.

Meanwhile, a variety of functions included in the game service platform server 301 in relation to the exemplary embodiments operate in association with a game service platform client application installed on the client terminal 320 to drive the game service platform. Alternatively, some of the functions are included in the game service platform client application of the client terminal 320, and the client terminal 320 autonomously drives and provides corresponding functions without operation of a server, or the client terminal 320 is provided with information on the functions of the game service platform server 301 from the game service platform server 301 and dominantly performs corresponding functions.

For example, if the user selects an address book friend addition function from a game service platform screen after a game service platform application is installed and executed on the client terminal 320, the client application directly reads address book data stored in the client terminal 320 and transmits the read address book data to the game service platform server 301. Then, the game service platform server 301 determines whether or not a user has joined as a member by comparing the address book data with member information stored in the member information database 451 and transmits a result of the determination to the client terminal 320, and thus the client terminal 320 may automatically register the user as a friend. In this manner, a variety of functions which will be described below according to an exemplary embodiment may be performed at a server, at a client terminal, or in association with the server and the client terminal.

Database Server

The database server 306 may include a member information database 451, a game information database 452, a friend information database 453, and a record information database 454. The database server 306 may further include other databases needed to provide the game service platform according to an exemplary embodiment.

The member information database 451 stores a variety of information on members who have joined as a service member or a game member through the game service platform. For example, the member information may include personal identification information of a corresponding member, a picture needed for profile information, a nickname, recently played games, installed games, information on a result or a record of each game, ranking information, information on challenging tasks, information on joined SNSs, information on settings of personal information exposure, information on settings of automatic login, and the like.

The game information database 452 stores information on a plurality of games associated with the game service platform server 301. For example, the game information may include information on software installed for each game, information on firm-up software, information on a version of each game, information on a record of each game, information on a challenging task of each game, information on a channel for connection to the game service platform server 301, and information on a member who has joined a corresponding game.

The friend information database 453 stores a variety of information related to a game friend automatically registered or registered by the user himself or herself according to an exemplary embodiment. For example, the friend information may include information on an ID and a nickname of a registered friend, information on a registration channel, and information on blocked friends.

The record information database 454 stores a variety of records according to a result of a game played by each member. For example, the records information may include the number of rounds played in each game, a score of a member in each game, a score of a challenging task, and the like.

General Service Procedure

Figure 5:
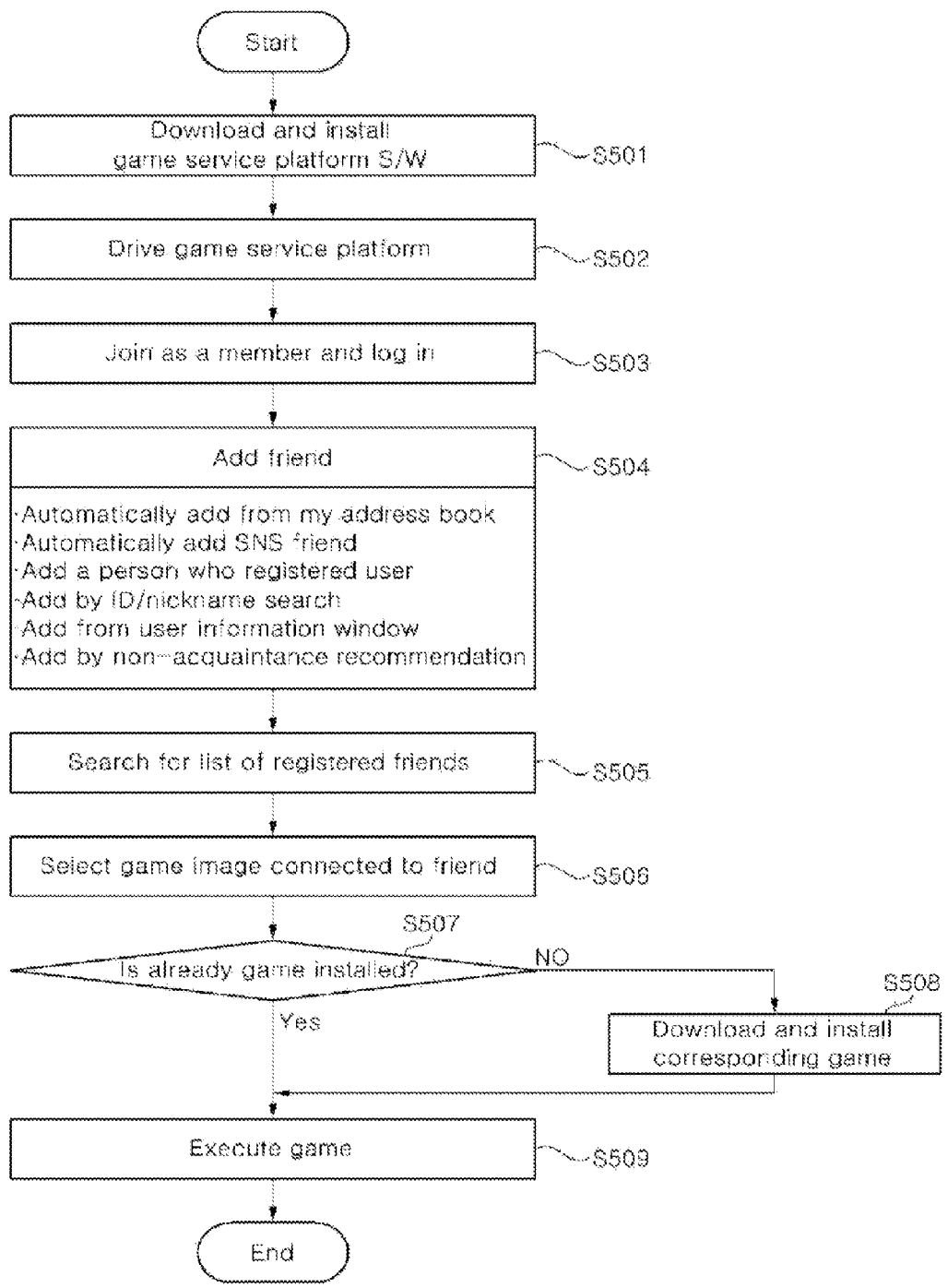
FIG. 5 is a flowchart illustrating a procedure of registering a friend in a game according to an exemplary embodiment.

FIG. 5 is a flowchart illustrating a procedure of registering a friend in a game according to an exemplary embodiment. First, a user of the client terminal 320 such as a smart phone downloads and installs game service platform software (step S501) and drives the installed game service platform (step S502). If the game service platform is driven and a step of joining the user as a member and logging into the game service platform is performed (step S503), a main screen is displayed on the client terminal 320 in the form as shown in FIG. 2.

At this point, according to an exemplary embodiment, the user executes a friend addition menu (step S504) and performs registration of a friend in a variety of methods in a submenu of the friend addition menu.

For example, it is possible to automatically add a friend from the user's address book (see FIG. 6), automatically add an SNS friend (see to FIG. 7), search and add a person who has registered the user (see FIG. 8), search and add a friend using an ID/nickname (see FIG. 9), or add a friend from a list provided on a user information window or provided by non-acquaintance recommendation (see FIG. 10).

If registration of a friend is completed as described above, the user may search for a list of members registered as game friends using the client terminal 320 (step S505). If a member in the member list provided as a result of the search accesses a specific game, the game currently accessed by the member can be indicated using a game image of the specific game accessed by the member or using another method. If the user selects a specific game from the list in a method of selecting a corresponding game image displayed for the member accessing the specific game or a corresponding member (step S506), game selection information including information on the game selected by the user is transmitted to the game service platform server 301, and the game service platform server 301 provides information needed for the user to immediately access and play the selected specific game based on the transmitted game selection information.

On the other hand, if the selected game is already installed on the client terminal 320 (step S507), the game can be immediately executed (step S509). However, if the game is not installed, the screen is switched to an installation menu of the game, and a game program is downloaded and installed (step S508).

In this manner, a state in which a member registered as a game friend accesses the specific game is confirmed, and if the friend is in a state in which the friend accesses the game such as in an online state, the user may immediately participate in the game through an interface provided by the game service platform according to an exemplary embodiment. In this manner, the user may enjoy the same game together with a registered game friend or play the same game in cooperation or in competition with each other.

Hereinafter, a procedure of registering a game friend according to a variety of exemplary embodiments will be described with reference to FIG. 6, FIG. 7, FIG. 8, FIG. 9, and FIG. 10.

Procedure of Registering a Game Friend

FIG. 6 is a flowchart illustrating a procedure of automatically registering a friend from an address book according to an exemplary embodiment. Referring to FIG. 6, if a user selects the 'addition of friend from address book' menu (step S601) in the friend addition step of FIG. 5 (step S504), friend registration request information containing information indicating selection of the 'address book friend addition' menu is transmitted to the game service platform server 301, and the game service platform server 301 searches for the address book of the client terminal 320 that has transmitted the friend registration request information or an address book list stored in the service server 300 (step S602). The searched targets are automatically registered as game friends (step S605).

On the other hand, if a user among the searched targets is not joined a game service, registration of a friend may not be automatically performed. Accordingly, it may be confirmed whether or not a target of the game friend registration has joined a game service (e.g., a service provided through the game service platform or an individual game service) (step S603). At this point, whether or not the target has joined a game service can be confirmed by inquiring the member information database 451 through the service server 300.

As a result of the confirmation (step S604), the user who has already joined the game service is automatically registered as a game friend (step S605) as described above, and a short message service (SMS) invitation advising the user who has not joined the game service yet to join the game service is transmitted to the phone number registered in the address book (step S606). As described above, the exemplary embodiments may be implemented to transmit various types of invitations to various forms of addresses registered in the address book, in addition to the phone number.

The SMS invitation may include link information that can directly connect to a corresponding game service join screen. Accordingly, a user receiving the SMS invitation joins the game service by selecting the link included in the SMS invitation, and the user can be additionally registered as a game friend as the user joins the game service.

This procedure can be performed in association with the game service platform client application installed on the client terminal 320 and the address book friend addition unit 431 of the friend management module 430 included in the game service platform server 301 of the service server 300.

FIG. 7 is a flowchart illustrating a procedure of automatically registering an SNS friend according to an exemplary embodiment. Referring to FIG. 7, if the user selects the 'addition of SNS friend' menu (step S701) in the friend addition step of FIG. 5 (step S504), friend registration request information containing SNS account information of the user (e.g., including information needed to log into an social network service, such as a name or an URL of the social network, or a user ID or a password) and information indicating selection of the SNS friend addition menu is transmitted to the game service platform server 301, and the game service platform server 301 performs connection to the SNS such as Facebook™ where the user of a corresponding client terminal 320 has joined and authentication on the SNS user account based on the user account information contained in the received friend registration request information (step S702). If authentication on the SNS user account is completed, SNS friends registered by the user are searched for (step S703). At this point, the registered SNS friends can be searched for through the SNS server 305. The searched targets are automatically registered as game friends (step S706).

On the other hand, if a user among the searched targets has not joined a game service, registration of a friend may not be automatically performed. Accordingly, it may be confirmed whether or not a target of the game friend registration has joined a game service (e.g., a service provided through the game service platform or an individual game service) (step S704). At this point, whether or not the target has joined a game service can be confirmed by inquiring the member information database 451 through the service server 300.

As a result of the confirmation (step S705), the user who has already joined the game service is automatically registered as a game friend (step S706) as described above, and an invitation or a summons (e.g., Facebook™ notification push) advising the user who has not joined the game service yet to join the game service is transmitted through a variety of functions (e.g., a push notification function, etc.) provided by the SNS service (step S707).

The invitation or summons preferably includes link information that can directly connect to a corresponding game service join screen. Accordingly, an SNS member receiving the invitation or summons joins the game service by selecting the link included in the invitation or summons, and the SNS member can be additionally registered as a game friend as the SNS member joins the game service.

This procedure can be performed in association with the game service platform client application installed on the client terminal 320 and the SNS friend addition unit 432 of the friend management module 430 included in the game service platform server 301 of the service server 300.

FIG. 8 is a flowchart illustrating a procedure by which a user registers a person, as a friend, who added the user as a friend according to an exemplary embodiment. Referring to FIG. 8, if the user selects the 'addition of person who registered me' menu (step S801) in the friend addition step of FIG. 5 (step S504), friend registration request information containing information indicating selection of the 'addition of person who registered the user' menu is transmitted to the game service platform server 301, and the game service platform server 301 recognizes the friend registration request information and determines whether or not there is a member who has registered the user as a game friend by searching for the friend information database 453 through the friend addition counterpart search unit 433 of the friend management module 430 included in the game service platform server 301.

A result of the search is transmitted to the corresponding client terminal 320, and the client terminal 320 receives the result of the search (step S803) and displays a list of searched targets (step S804). A game friend is registered by selecting a specific member among the displayed targets (step S805).

FIG. 9 is a flowchart illustrating a procedure of registering a friend by user search according to an exemplary embodiment. Referring to FIG. 9, the search is performed by selecting the 'addition of friend by searching for ID or nickname' menu in the friend addition step of FIG. 5 (step S504) and inputting a search keyword. At this point, friend registration request information containing the search keyword inputted by the user and information indicating selection of the 'add friend by search for a member using ID or nickname' menu is transmitted to the game service platform server 301, and the game service platform server 301 determines whether or not there is a member corresponding to the search keyword by searching the friend information database 453 using the search keyword included in the received information through the ID/nickname search unit 434 of the friend management module 430 included in the game service platform server 301.

A result of the search is transmitted to the corresponding client terminal 320, and the client terminal 320 receives and displays the result of the search (step S902). Meanwhile, if there is a registered member corresponding to the search keyword as a result of the search (step S903), a game friend is registered by selecting the member from the result of the search (step S904).

Procedure of Recommending Friend

FIG. 10 is a flowchart illustrating a procedure of recommending a friend at a server according to an exemplary embodiment. Referring to FIG. 10, if a user selects 'friend recommendation' (i.e., add a friend by recommending a non-acquaintance) (step S1001) in the friend addition step of FIG. 5 (step S504), friend registration request information containing information indicating selection of the 'friend recommendation' is transmitted to the game service platform server 301, and the game service platform server 301 recognizes the friend registration request information and recommends specific members among registered members as targets to be added as friends based on a predetermined algorithm or rules.

At this point, in response to the selection of the 'friend recommendation', the non-acquaintance recommendation processing unit 435 of the friend management module 430 included in the game service platform server 301 searches the member information database 451 (step S1002) and determines members matched to the user as target game friends.

For example, the user selects members only as many as a predetermined number (e.g., 25 members) among the members matched to corresponding conditions, based on information on games installed on the client terminal 320, information on recently played games, information on game rankings, information on locations of users, information on accessing a game and the like, and recommends the selected members as target game friends (step S1003). For example, ranking information of the user is confirmed, and a specific number of currently accessing users may be selected and recommended among the users who have rankings close to the ranking of the user. That is, since it is possible to play a game with the currently accessing users, the currently accessing users are preferably recommended with a higher priority. In addition, users who have installed a game that is the same as the game installed on the client terminal 320 by the user can be recommended, or users who have recently played a game that has been recently played by the user can be recommended, or users located in the neighborhood of the user can be recommended based on the location information of the user, or users having a game accessing time zone close to that of the user can be recommended based on game accessing information of the user. It is apparent to those skilled in the art that target game friends can be recommended by compositively combining and using one or more pieces of information described above. Here, the game friends being added by such procedure are called "rival friends," and a request to register friends among recommended friends may be called "a request for addition of rival friends."

The recommended list is displayed on the client terminal 320, and game friends are registered by selecting specific members among the recommended targets (step S1004).

Meanwhile, a game friend can be immediately registered from the recommended list, or a game friend can be registered after executing a game accessed by a member and playing the game together with the member. At this point, the exemplary embodiments can be implemented to automatically register a friend only by participating in a game together, or a member is registered only as a recommended target, and then the target can be finally registered as a game friend by the selection of the user when the game is over.

Example of Implementing Game Service Platform

Figure 11:
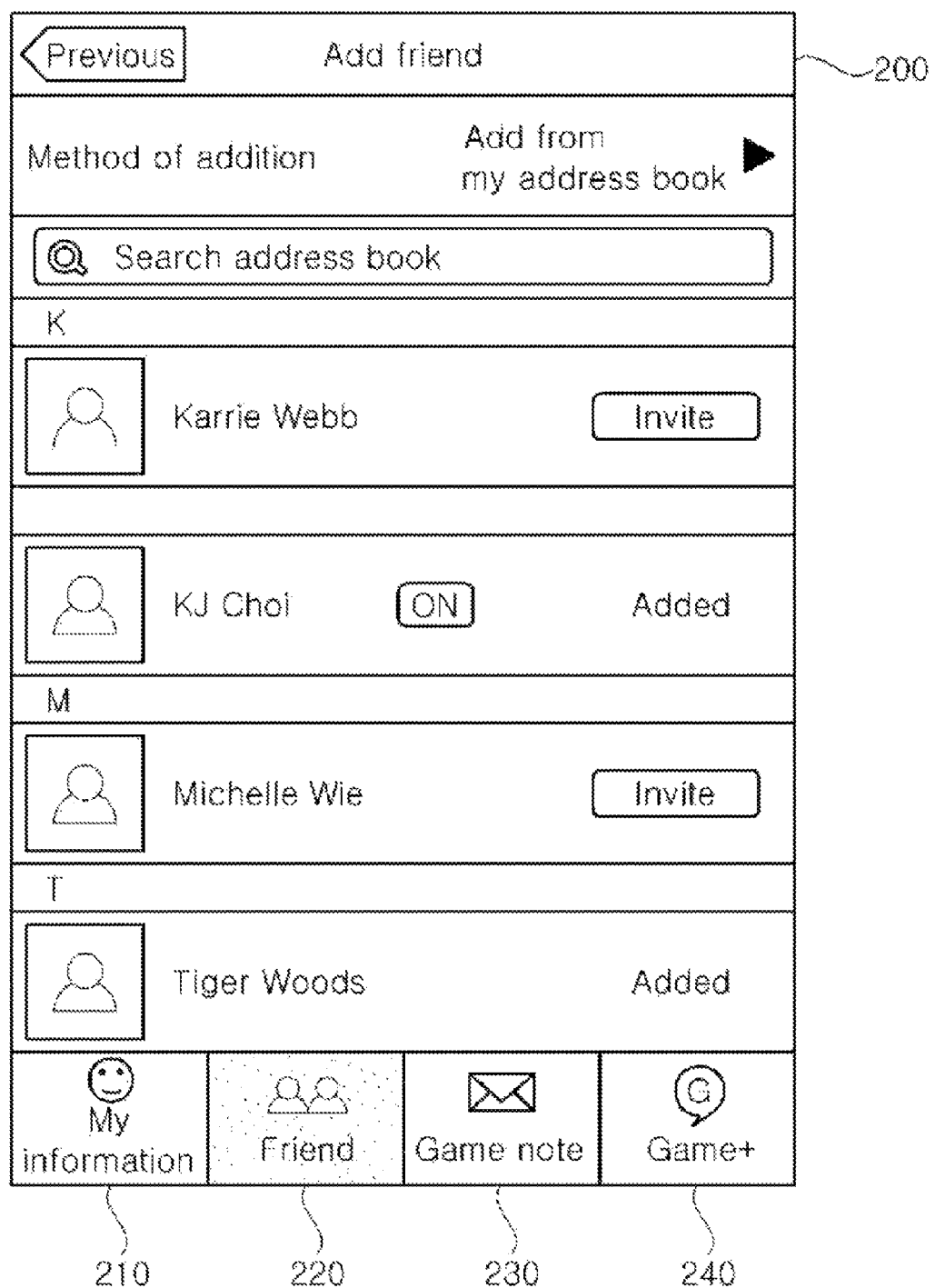
FIG. 11 is a view showing a screen for automatically registering a friend from an address book on a smart phone according to an exemplary embodiment.

FIG. 11 is a view showing a screen for automatically registering a friend from an address book on a smart phone according to an exemplary embodiment. Referring to FIG. 11, if the user selects 'addition of friend from address book' as described above in FIG. 6, users stored in the address book of the client terminal 320 can be automatically extracted and registered as friends. At this point, as described above, members who have already joined a game service (e.g., Michelle Wie and K J Choi of FIG. 11) among the extracted users are indicated as already added as game friends, and whether or not the members are logged in can be displayed at the same time. On the other hand, the exemplary embodiments can be implemented to transmit an SMS invitation by clicking an invitation button or automatically transmit an SMS invitation to a member who has not joined a game service yet (e.g., Karrie Webb and Tiger Woods of FIG. 11) among the extracted users.

Figure 12:
FIG. 12 is a view showing a screen for automatically registering an SNS friend on a smart phone according to an exemplary embodiment.

FIG. 12 is a view showing a screen for automatically registering an SNS friend on a smart phone according to an exemplary embodiment. Referring to FIG. 12, if the user selects 'addition of SNS friend' (e.g., Facebook™ friend) as described above in FIG. 7, the user's SNS ID (e.g., 'BIG-DADDY') is searched for through user account authentication, and then SNS friends registered by the user are searched for and displayed in a list. At this point, as described above, members who have already joined a game service (e.g., Two Marlines and Sharapova of FIG. 12) among the extracted SNS friends are indicated as already added as game friends, and whether or not the members are logged in can be displayed at the same time. On the other hand, the exemplary embodiments can be implemented to transmit an invitation or summons provided by the SNS service by clicking an invitation button or automatically transmit an invitation or a summons to a member who have not joined a game service yet (e.g., Brown Bear and Protoss of FIG. 11) among the extracted SNS friends.

Figure 13:
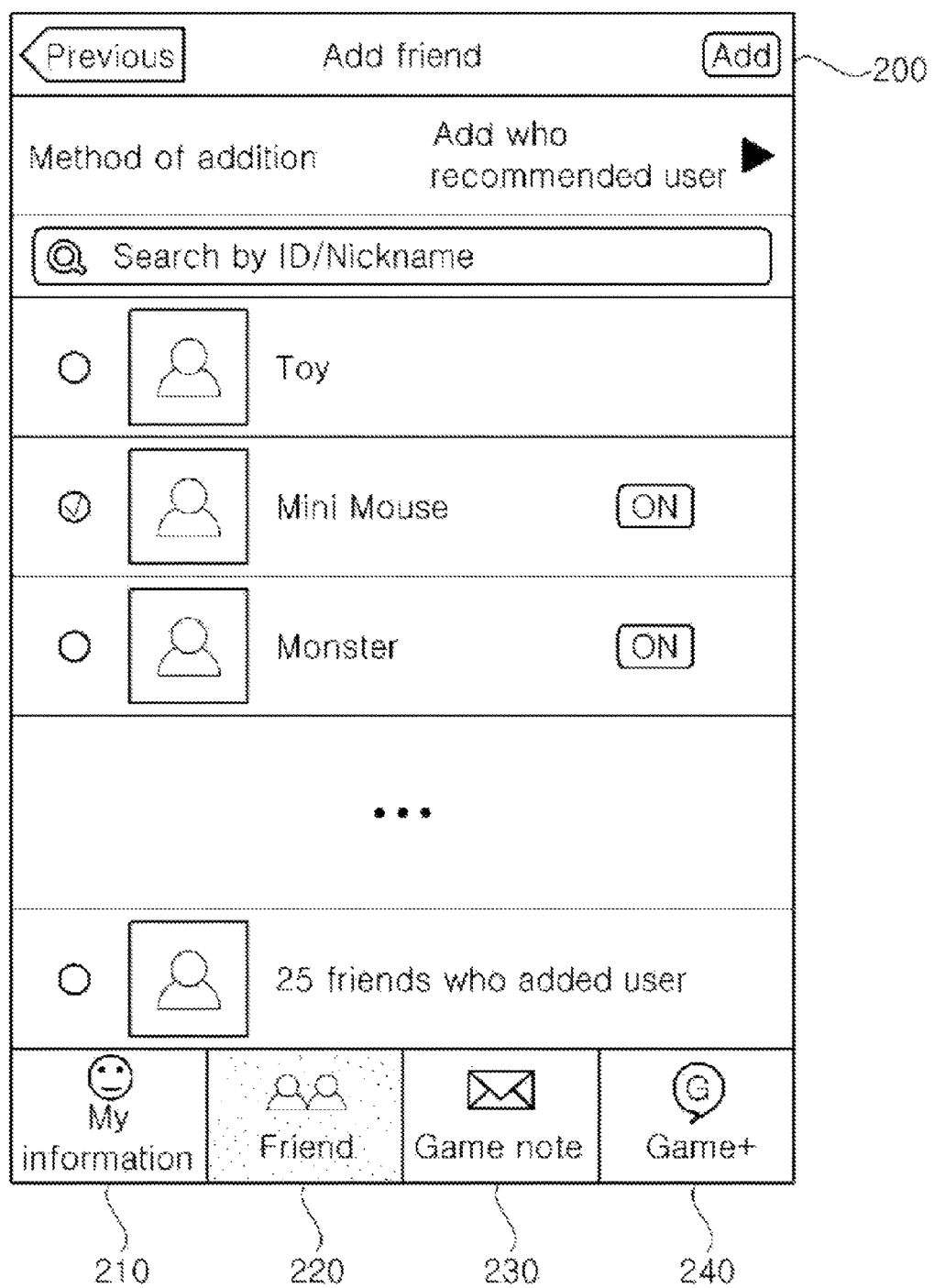
FIG. 13 is a view showing a screen in which a user registers a person, as a friend, who added the user as a friend on a smart phone according to an exemplary embodiment.

FIG. 13 is a view showing a screen in which a user registers a person, as a friend, who added the user as a friend on a smart phone according to an exemplary embodiment. Referring to FIG. 13, if the user selects 'addition of person who registered the user' as described above in FIG. 8, corresponding members are searched through the service server 300 and displayed in a list. At this point, the exemplary embodiments can be implemented to automatically add the searched members as a friend or to add a member as a friend by the selection of the user after providing a list of members beforehand.

Meanwhile, in the present exemplary embodiment, since the search is performed based on the users who have already joined the game service as members, an invitation or summons advising the users to join the game service does not need to be transmitted separately as described above in the aforementioned exemplary embodiments. In addition, in the same manner, whether or not the searched members have an access to the game service can be displayed at the same time.

Figure 14:
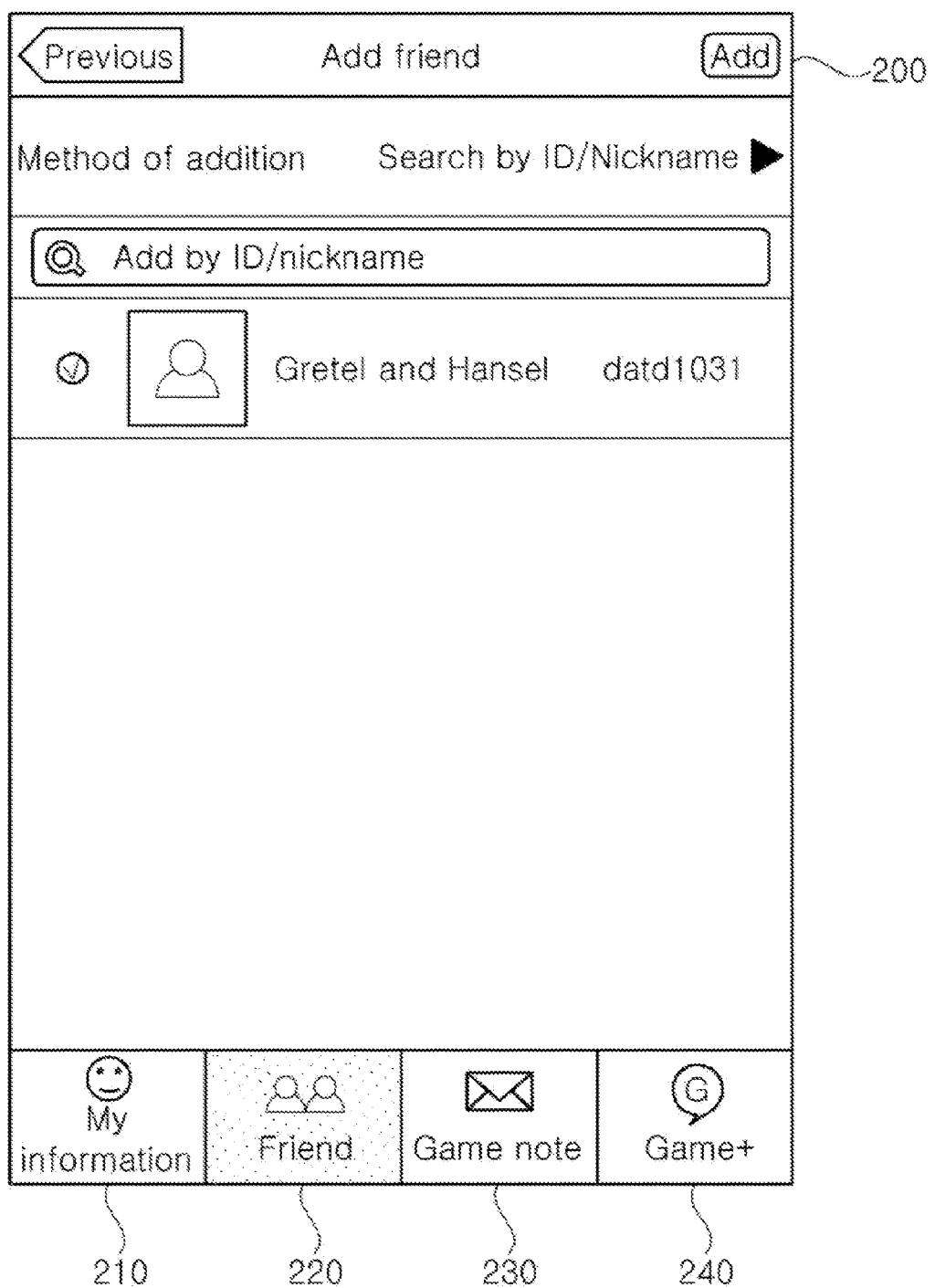
FIG. 14 is a view showing a screen for registering a friend by user search on a smart phone according to an exemplary embodiment.

FIG. 14 is a view showing a screen for registering a friend by user search on a smart phone according to an exemplary embodiment. Referring to FIG. 14, if the user selects 'addition of friend by searching for ID or nickname' as described above in FIG. 9, a search window for inputting a search keyword is provided, and a result of searching for members corresponding to the inputted search keyword can be provided by inputting the search keyword into the search window. At this point, the exemplary embodiments can be implemented to automatically add the searched members as friends or to add a member as a friend by the selection of the user after providing a list of members beforehand.

Figure 15:
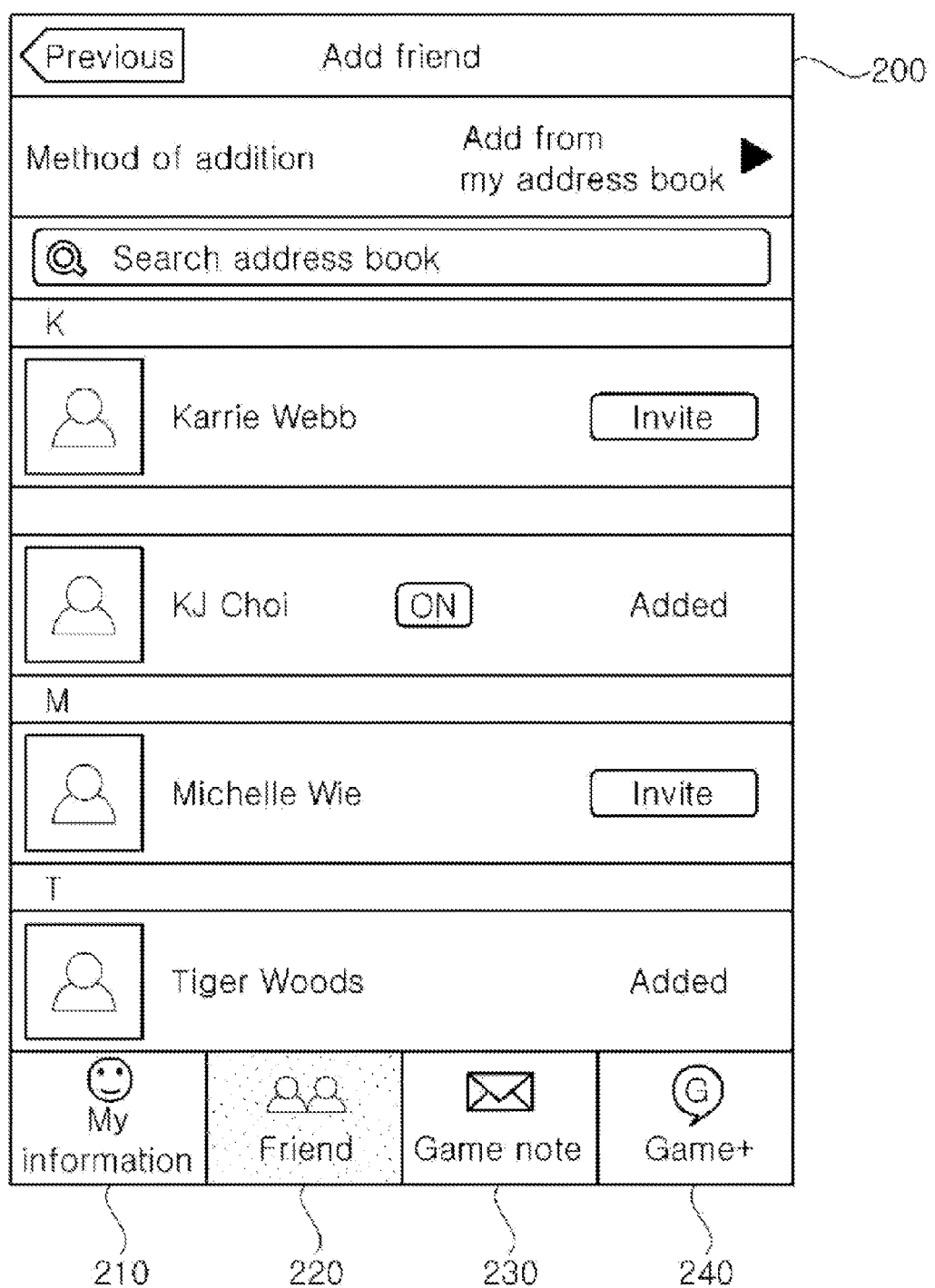
FIG. 15 is a view showing a screen for recommending a friend on a smart phone according to an exemplary embodiment.

FIG. 15 is a view showing a screen for recommending a friend on a smart phone according to an exemplary embodiment. Referring to FIG. 15, if the user selects the 'friend recommendation' menu as described above in FIG. 10, members determined based on a predetermined algorithm or rules (e.g., currently accessing members among the members whose rankings are close to that of the user) are provided in a recommendation list. At this point, the exemplary embodiments can be implemented to automatically add the searched members as friends or to add a member as a friend by the selection of the user after providing a list of members beforehand.

Figure 16:
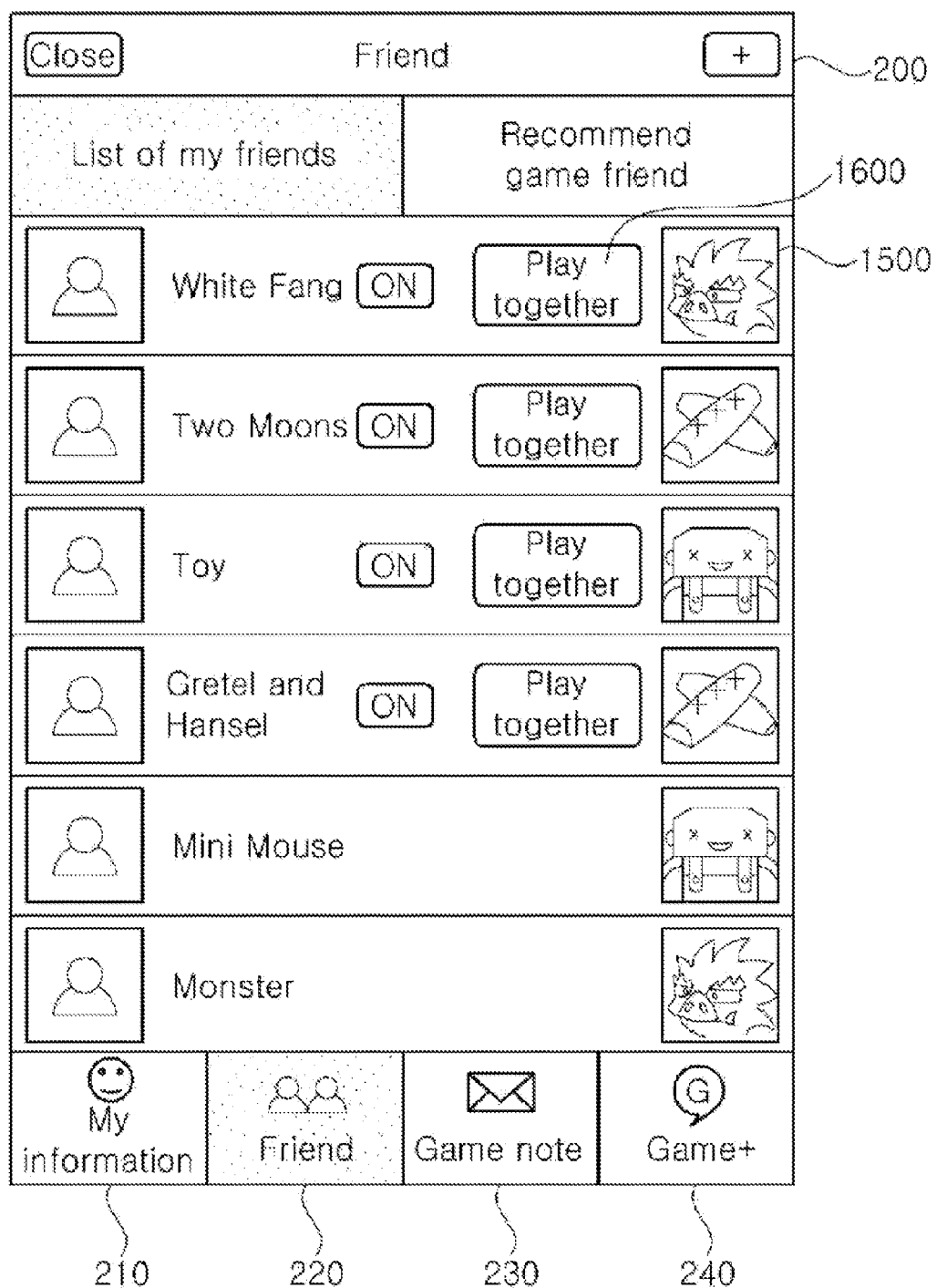
FIG. 16 is a view showing a screen for executing a game through a list of registered friends according to an exemplary embodiment.

In addition, a game image 1500 of the game that a member is currently accessing and executing can be provided on the right side of the ID or nickname of the recommended member as shown in FIG. 16, which will be described later. If the provided image is selected, the user may directly access and participate in the corresponding game. At this point, as described above, if the selected game is not installed on the client terminal 320 yet, the screen is switched to an installation menu of the game, and a procedure of installing the game is performed first.

FIG. 16 is a view showing a screen for executing a game through a list of registered friends according to an exemplary embodiment. Referring to FIG. 16, if registration of the game friends is completed in a variety of methods as described above, the list of the registered game friends can be confirmed through the 'List of my friends' menu. At this point, whether or not a friend accesses the game and an image of a recently played game or a currently played game can be displayed in the list of the registered game friends. If the provided game image 1500 is selected or the play game together button 1600 is clicked, the user may immediately access and participate in the corresponding game. At this point, as described above, if the selected game is not installed on the client terminal 320 yet, the screen is switched to an installation menu of the game, and a procedure of installing the game is performed first.

Once game friends have been registered, the system allows a user's game friends or other various groups to be ranked, which leads to increased involvement in the game for a user.

Game Service Platform Server Including a Group Ranking Management Module

Figure 17:
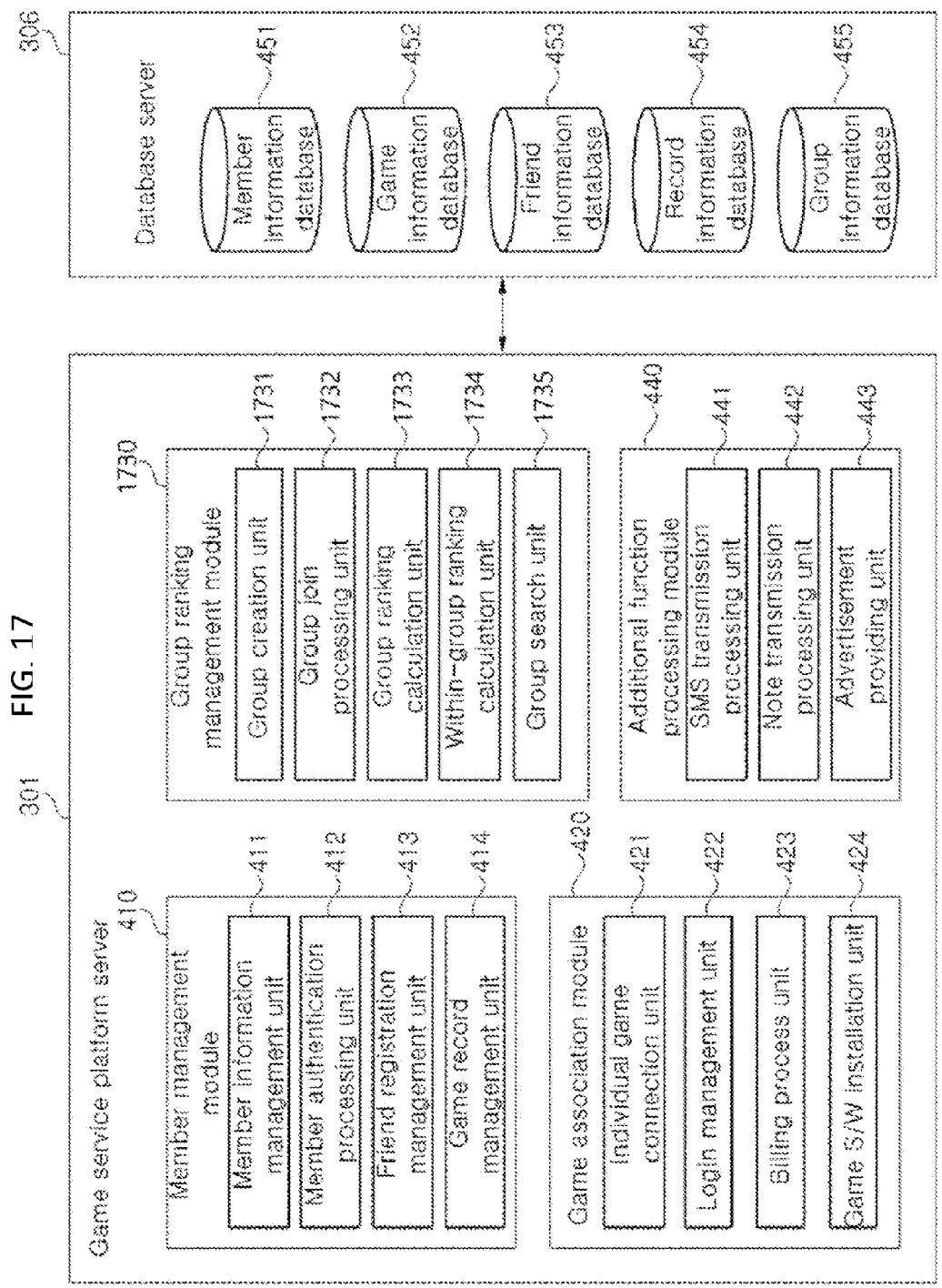
FIG. 17 is a view showing a structure of a game service platform server and a database server according to an exemplary embodiment.

FIG. 17 is a view showing a structure of the game service platform server 301 and the database server 306 according to an exemplary embodiment which corresponds to FIG. 4, but wherein details of friend management module 430 are replaced with details of group ranking management module 1730.

The game service platform server 301 may include a member management module 410, a game association module 420, a group ranking management module 1730, and an additional function processing module 440 as shown in FIG. 17. The database server 306 for storing and transmitting a variety of data in association with the game service platform server 301 may include a member information database 451, a game information database 452, a friend information database 453, a record information database 454, and a group information database 455.

The member management module 410 manages a variety of personal information registered when a user joins a game service platform or an individual game as a member, and manages game records and information on friends registered by each member. The game association module 420 allows the game service platform server 301 to operate in association with individual games of the game server 302, and may allow the game service platform to process login and billing of the individual games. The group ranking management module 1730 performs a function of creating a group or processing a request to join the created group and may provide a function of calculating a ranking within each created group and a ranking among the groups. The additional function processing module 440 can provide a variety of functions that can be additionally provided in relation to a game service.

All or some of detailed function units included in each module 410, 420, 1730, and 440 of the game service platform server 301 may also be included in a service platform client application installed in the client terminal 320, and some of the detailed function units may be processed in an associated or distributed manner according to a server and client system.

Hereinafter, detailed functions of each of the modules will be described in detail.

The member management module 410 may include a member information management unit 411, a member authentication processing unit 412, a friend registration management unit 413, and a game record management unit 414. The member information management unit 411 may store a variety of information related to a member when a user accesses the game service platform server 301 and joins a service through the game service platform server 301 or updates a variety of information related to the member modified through an information home of the game service platform within the member information database 451.

The member authentication processing unit 412 performs authentication in association with the authentication server 303 when a user who has joined as a member logs in the game service platform or a game. The friend registration management unit 413 performs a function of managing game friends of a registered member. The game record management unit 414 performs a function of managing records of each game, records of all games, and ranking information of a member.

The game association module 420 may include an individual game connection unit 421, a login management unit 422, a billing process unit 423, and a game software (S/W) installation unit 424. The individual game connection unit 421 performs an interface function for connecting a user to a specific game when the game is selected among a plurality of games provided in the game server 302. The login management unit 422 performs a function of processing log in into a game in an integrated manner or individually processing log in into each game when a user accesses the game through the game service platform. The billing process unit 423 performs a function of processing billing in association with the payment server 304 when a connected game is a pay game. The game S/W installation unit 424 performs a function of automatically proceeding to a game S/W installation step and installing a game S/W when a user desires to access a specific game through the game service platform and S/W corresponding to the game is not installed in the client terminal 320.

Figure 19:
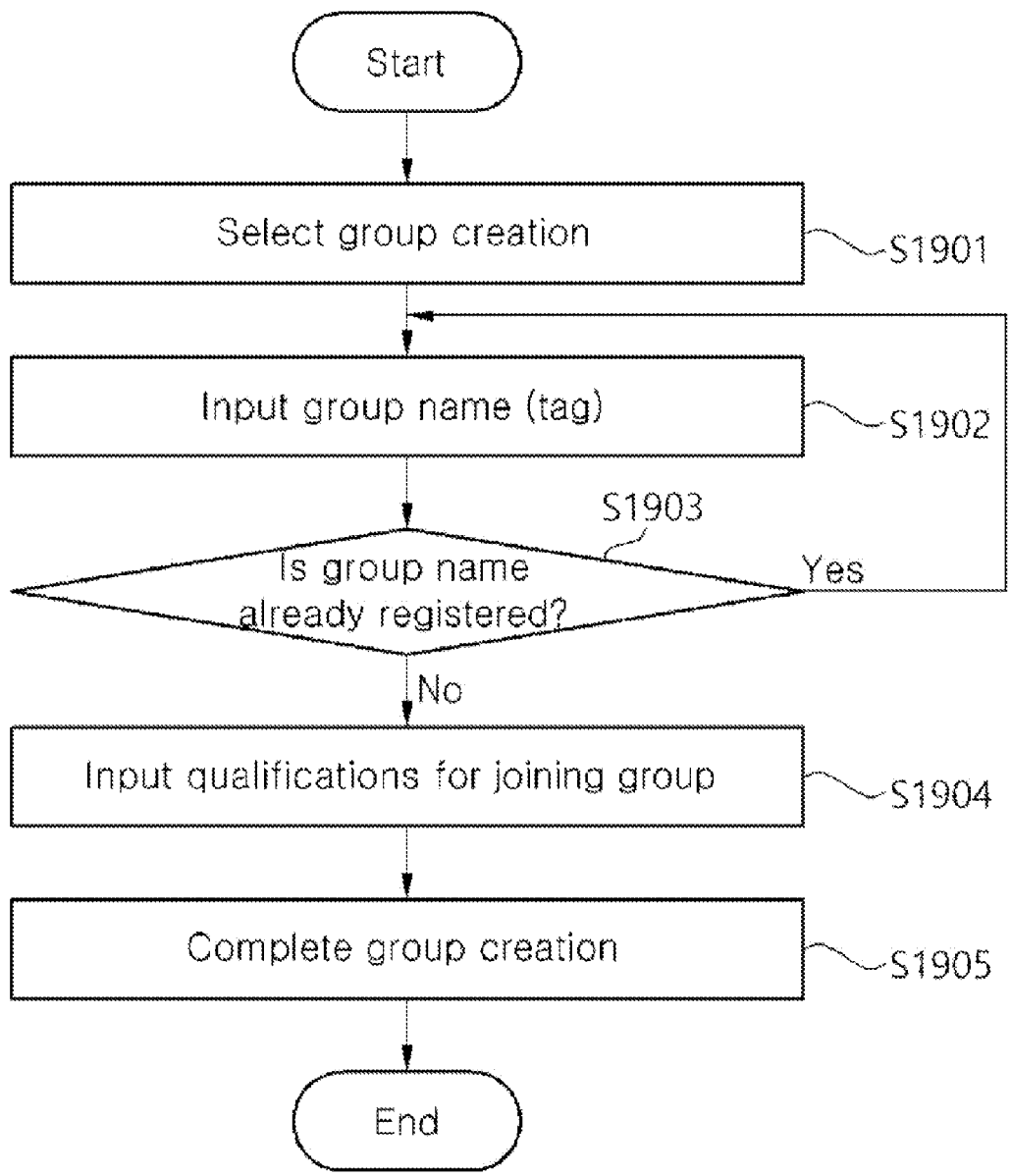
FIG. 19 is a flowchart illustrating a method of creating a group according to an exemplary embodiment.
Figure 20:
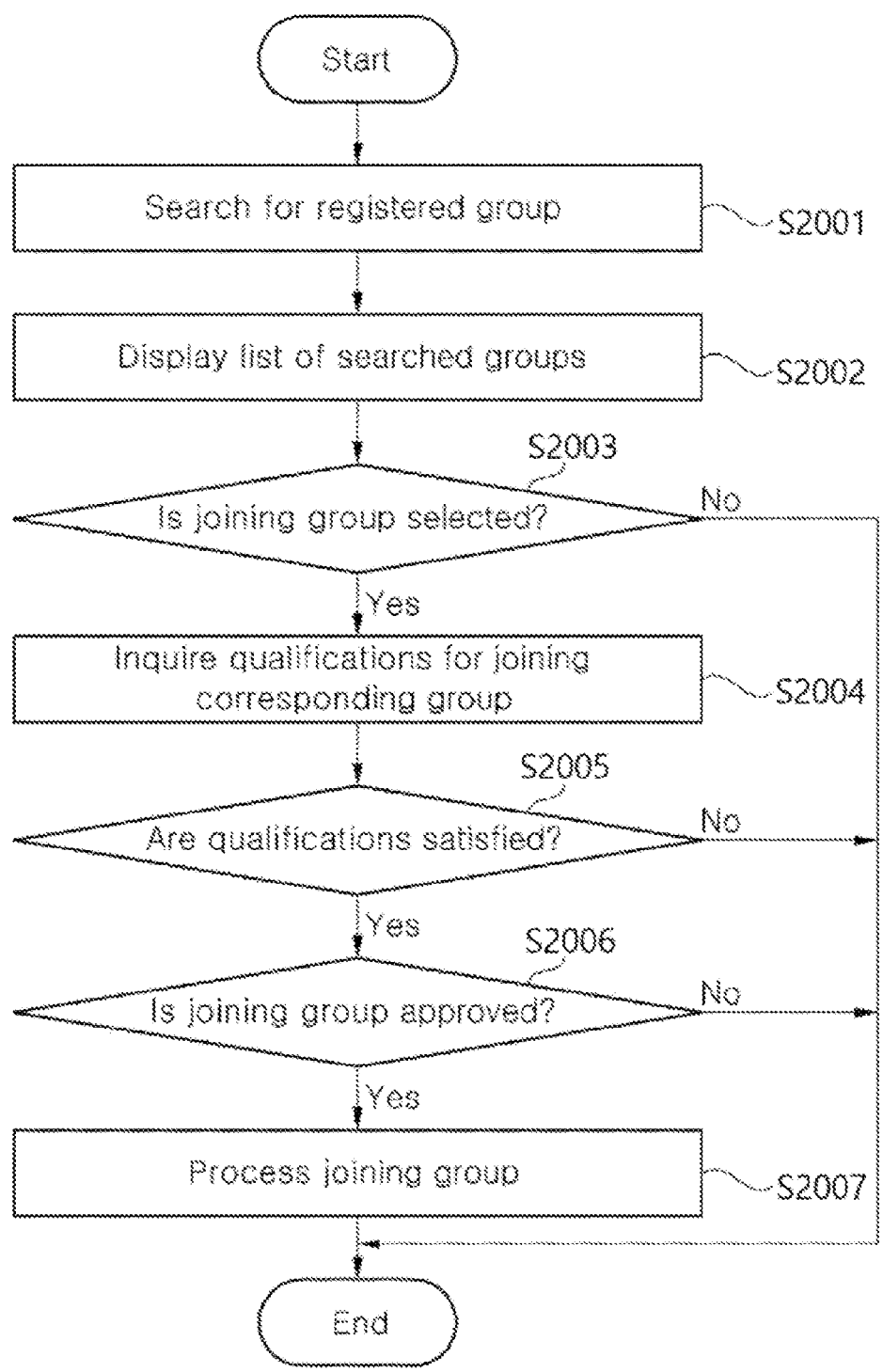
FIG. 20 is a flowchart illustrating a method of joining a group according to an exemplary embodiment.
Figure 21:
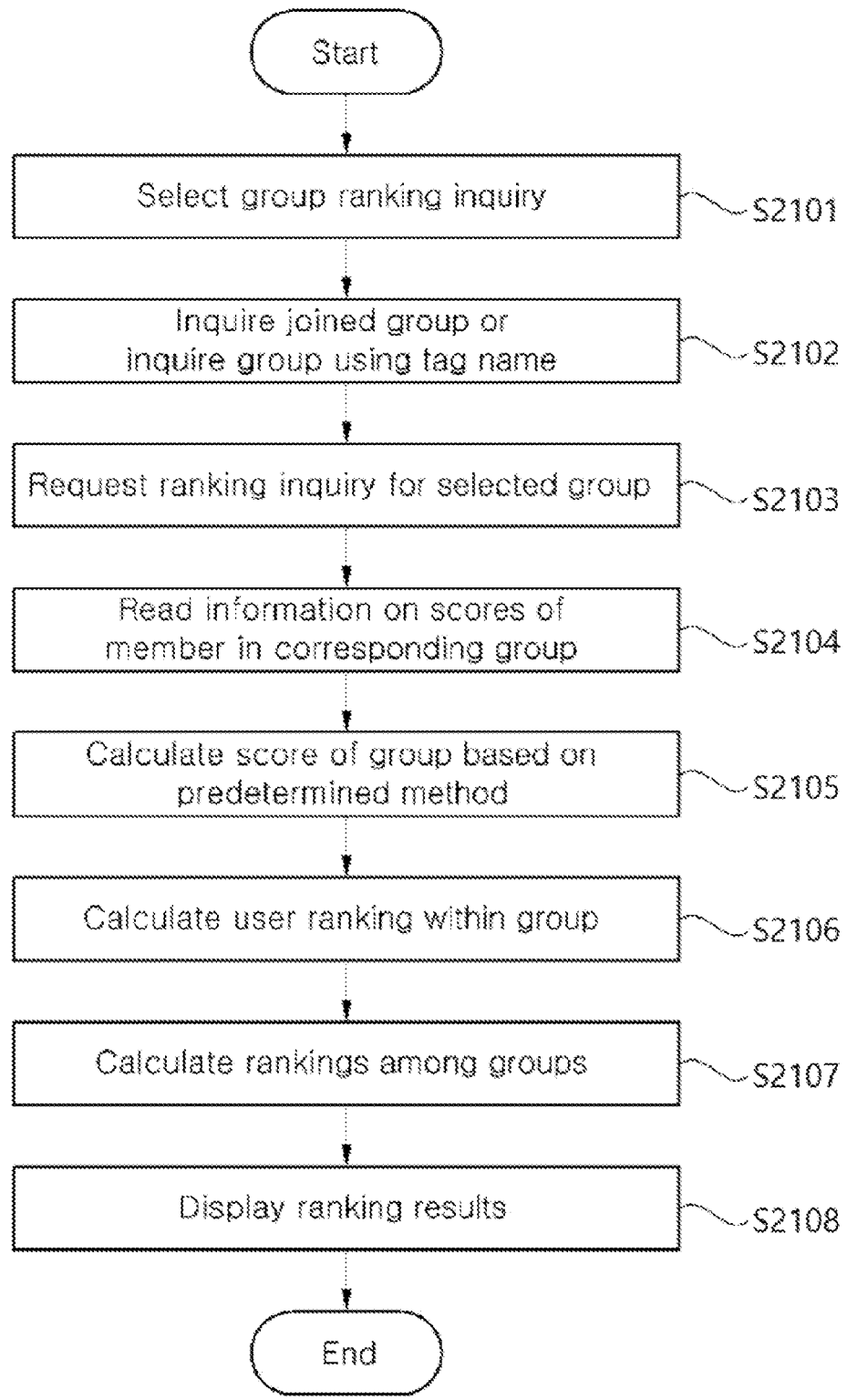
FIG. 21 is a flowchart illustrating a method of inquiring a group ranking according to an exemplary embodiment.

The group ranking management module 1730 may include a group creation unit 1731, a group join processing unit 1732, a group ranking calculation unit 1733, a within-group ranking calculation unit 1734, and a group search unit 1735. As shown in FIG. 19, which will be described below, the group creation unit 1731 may create a new group by adding some or all of the game friends registered by a user through the game service platform, may create a new group by adding some or all of the game service members registered as a friend in an SNS service the user has joined, or may create a new group using a tag (or a keyword). The group can be created with respect to all the game service members, or specific qualifications for joining the group may be separately added when the group is created. The group join processing unit 1732 performs a joining process for each group created by the group creation unit 1731 as shown in FIG. 20, which will be described below. The group ranking calculation unit 1733 and the within-group ranking calculation unit 1734 perform a function of calculating a ranking of a corresponding group among all groups (as shown in FIG. 21 which will be described below) and a ranking of each member within a created group, respectively. The group search unit 1735 performs a function of inputting a tag (or a keyword) through the game service platform and searching for a group stored in the group information database 455.

Each function unit of the group ranking management module 1730 may facilitate creation of a group and addition of members to a group, and may calculate and provide a variety of ranking information related to each created group.

The additional function processing module 440 may include a short message service (SMS) transmission processing unit 441, a note transmission processing unit 442, and an advertisement providing unit 443. The SMS transmission processing unit 441 and the note transmission processing unit 442 provide a function of transmitting a SMS message or a note to a registered friend or a user in a joined group. The advertisement providing unit 443 performs a function of providing information or advertisements related to a variety of games associated with the game service platform.

In some cases, a variety of functions included in the game service platform server 301 may operate in association with a game service platform client application installed in the client terminal 320 to drive the game service platform. For example, some of the functions can be included in the game service platform client application of the client terminal 320, and the client terminal 320 may autonomously drive and provide corresponding functions without requiring a server. In some cases, the client terminal 320 may be provided with information on the functions of the game service platform server 301 from the game service platform server 301 and may dominantly perform corresponding functions.

For example, if the user selects a ranking inquiry function for a specific group that the user has joined from a game service platform screen after a game service platform application is installed and executed in the client terminal 320, the client application may request a corresponding inquiry of ranking from the game service platform server 301. Then, the game service platform server 301 may inquire group information stored in the group information database 455 through the group ranking calculation unit 1733 or the within-group ranking calculation unit 1734, calculate a ranking within the corresponding group and a ranking of each group, and transmit the calculated result to the client terminal 320. The client terminal 320 may subsequently confirm the result of the inquiry. Accordingly, a variety of functions may be performed at a server 410, at a client terminal 320, at both the server 410 and the client terminal 320.

Database Server

The database server 306 may include a member information database 451, a game information database 452, a friend information database 453, a record information database 454, and a group information database 455, and may further include other databases needed for providing the game service platform.

The member information database 451 stores a variety of information on members who have joined as a service member or a game member through the game service platform. For example, the member information may include personal identification information of a corresponding member, a picture needed for profile information, a nickname, an avatar, recently played games, installed games, information on a result or a record of each game, ranking information, information on challenging tasks, information on joined SNSs, information on settings of personal information exposure, and information on settings of automatic login.

The game information database 452 stores information on a plurality of games associated with the game service platform server 301. For example, the game information may include information on software installed for each game, information on firm-up software, information on a version of each game, information on a record of each game, information on a challenging task of each game, information on a channel connecting to the game service platform server 301, and information on a member who has joined a corresponding game.

The friend information database 453 stores a variety of information related to SNS game friends registered by a user as a friend or automatically registered in association with an SNS server. For example, the friend information may include information on an ID and a nickname of a registered friend, information on a registration channel, and information on blocked friends.

The record information database 454 may store a variety of records according to a result of a game played by each member. For example, the records information may include a number of rounds played in each game, a score of a member in each game, and a score of a challenging task.

The group information database 455 may include information on a group created through the group creation unit 1731 (e.g., tag information of a group, information on a group creator, and information on qualifications for joining a group) and information on a group member who joined through the group join processing unit 1732.

Overall Service Procedure

Figure 18:
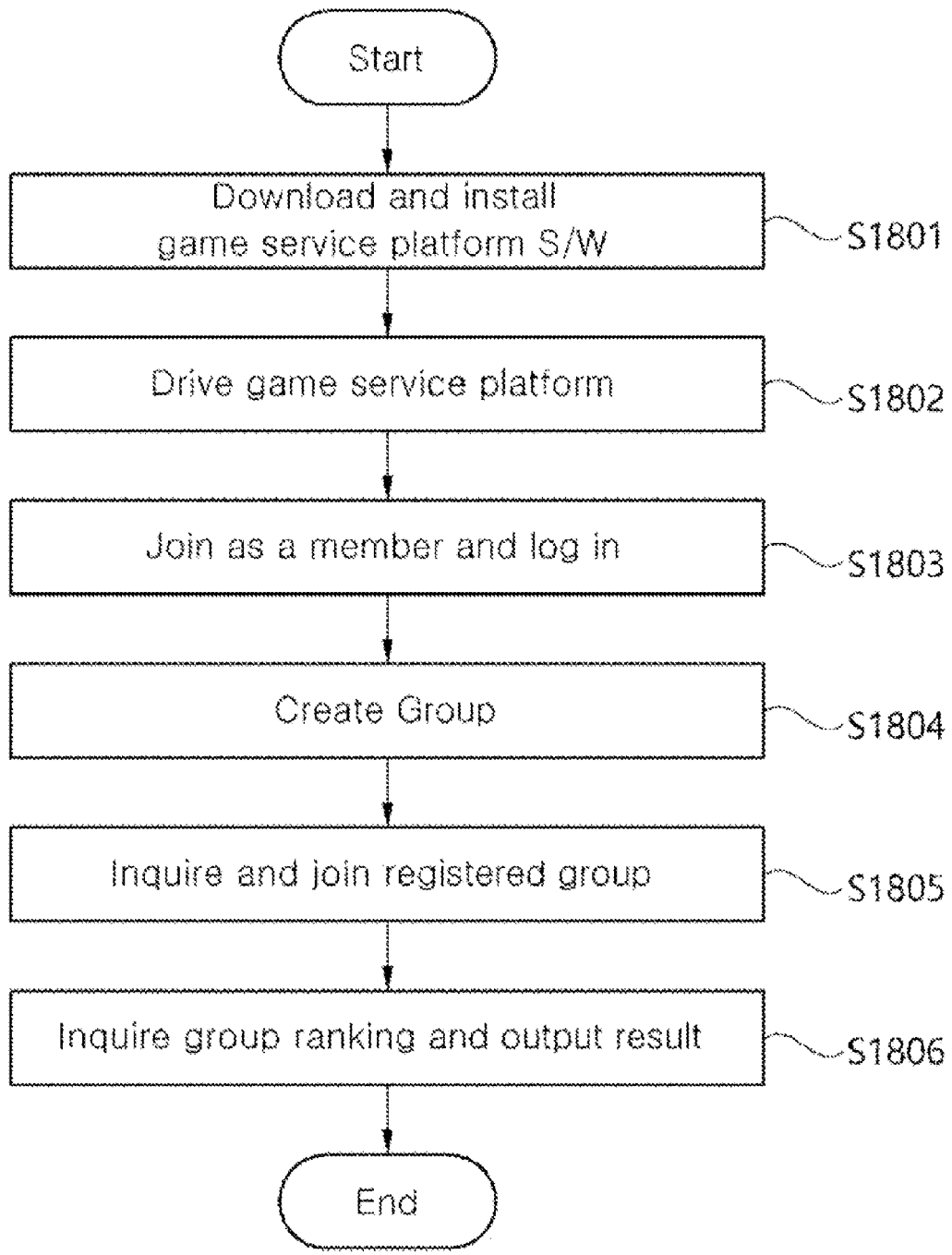
FIG. 18 is a is a flowchart illustrating a method of providing a game according to an exemplary embodiment.

FIG. 18 is a flowchart illustrating a method of providing a game according to exemplary embodiments of the present invention. First, a client terminal 320 (e.g., a smart phone) may download and install a game service platform software S/W (S1801), and drive the installed game service platform (S1802). Then, the user may join the game service platform as a member and log into the game service platform (S1803).

The user may then create a group using several methods (S1804). For example, the user may create a group of friends by adding friends, may create a group of SNS friends registered via user account authentication of an SNS service that the user has joined, and/or may create a new group by registering a tag. In some cases, if the user would not like to create a new group, the user may inquire about a previously-registered group using a tag and join the group (S1805). In some cases, in addition to creating a new group, the user may inquire about a previously-registered group using a tag and join the group (S1805)

It should be understood that the user may create or join one or more groups in S1804 and S1805. The user may create a group by adding friends, create an SNS friend group, and/or create a new group by registering a tag in any order or in parallel. To create a friend group by adding friends, a new group can be created using a method of selecting or adding some or all of the friends registered by the user. To create an SNS friend group, a new group can be created using a method of selecting or adding some or all of the game service members registered as a friend in an SNS service that the user has joined. To create a new group by registering a tag, a new group can be created using a method of inputting a tag mapped to a new group created by the user. If one or more groups are created, rankings of a corresponding group can be inquired through the game service platform, and a ranking within the group and ranking information of each group may be outputted through the game service platform as a result of the inquiry (S1806).

Hereinafter, methods of creating and joining a group and inquiring about rankings of the group according to exemplary embodiments of the present invention will be described with reference to FIG. 19, FIG. 20, and FIG. 21.

Procedure of Creating a Group

A group which provides ranking information may be created using a variety of methods. A group of friends may be registered according to a variety of methods (e.g., friends registered in an address book, friends registered in an SNS). A group may be created including the registered friends, or a small group can be separately created by selecting some of the friends from the registered group of friends.

As shown in FIG. 19, a user may create a new group by registering a tag, and all the game service members can be registered as a member of the group. FIG. 19 is a flowchart illustrating a method of creating a group according to exemplary embodiments of the present invention. If a group creation menu is selected through the game service platform (S1901), a new group is created by inputting a group name or a tag (S1902). If the group name or the tag is a word already registered (S1903), another group name or tag is inputted. This step may be repeated until a name that is not registered is input.

When an inputted group name is not registered, qualifications (e.g., an age, a region, a game ranking) for joining the group may be input (S1904). Accordingly, creation of the group is completed (S1905).

Although exemplary embodiments described above describe that a group may be created by inputting a group name or a tag, in some cases, one or more tags may additionally be set after the group name is set. For example, after three tags are set to one group name, a user may search for a corresponding group by inputting the registered group name or tag. When a group is searched using a tag, a plurality of groups including the same tag can be obtained as a result of the search. For example, if a person living in Orange County searches for a group by searching for 'Orange County' as a tag, a plurality of groups (e.g., 'Orange County working mom', 'Orange County NHN') including 'Orange County' as a tag can be searched.

Procedure of Joining a Group

FIG. 20 is a flowchart illustrating a method of joining a group according to exemplary embodiments of the present invention. As shown in FIG. 20, registered groups may be searched for by entering a group name through the game service platform (S2001). According to a search result of the entered group name, a list of searched groups may be displayed (S2002). The game service platform may determine if the user has selected a specific group to join from the list (S2003). If a group is not selected, the method for joining a searched group may end.

If a group is selected, a group join request signal may be transmitted to the group join processing unit 1732 of the group ranking management module 1730 included in the game service platform server 301 of the service server 300, and the group join processing unit 1732 may determine whether or not the user requesting to join the group meets the qualifications for joining the group based on the group information database 455 (S2004). If the user meets the qualifications as a result of the determination (S2005), the process of joining the group for the user may, in some cases, be complete (S2007).

In some cases, the user may be approved immediately to join the group if the user meets the qualifications as described above, but, in some cases, the service server 300 or the creator of the group may need to approve the user's request to join the group (S2006).

Procedure of Inquiring about a Group Ranking

Figure 23:
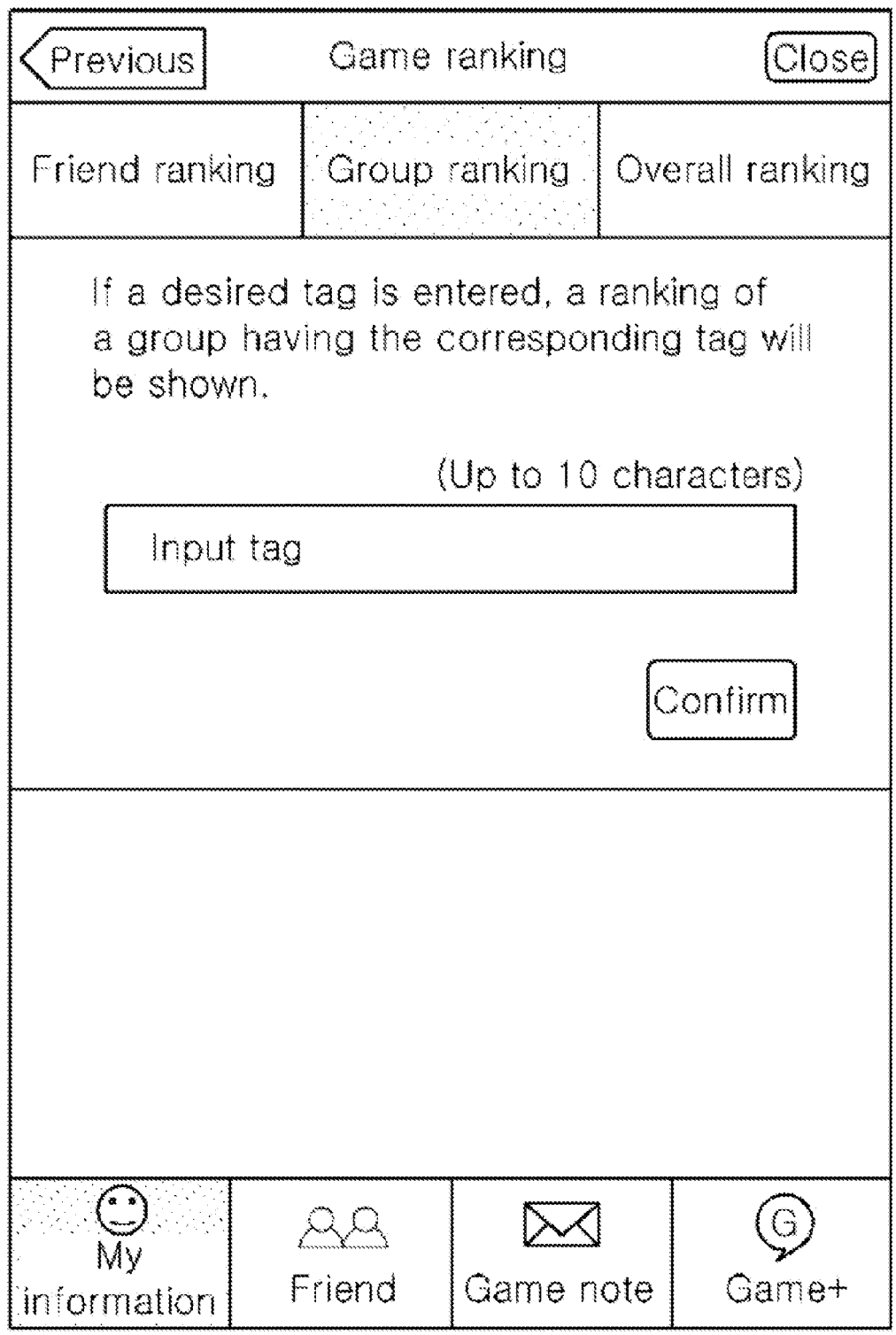
FIG. 23 is a view showing a screen of a smart phone, displaying a group ranking inquiry according to an exemplary embodiment.

FIG. 21 is a flowchart illustrating a procedure of inquiring about a group ranking according to exemplary embodiments of the present invention. As shown in FIG. 21, if the user selects a group ranking inquiry through the game service platform (S2101), a tag input window for the group ranking inquiry is provided, as shown in FIG. 23. A joined group may be searched for or inquired about, or a new group may be created with other members as described in FIG. 18. For example, a group may be inquired about by inputting a tag name into the tag input window (S2102). If ranking inquiry for a group corresponding to the input tag name is requested from the service server 300 (S2103), the group ranking management module 1730 of the service server 300 may confirm a list of members of the group through the group information database 455, determine whether a plurality of game services associated with the game service platform is installed in terminals of the members of the joined or created game group, and read scores of each member from the record information database 454. The client terminal 320 may receive, from the service server 300, information regarding the results of the determination of whether the plurality of game services associated with the game service platform is installed in terminals of the members of the group. A list of the plurality of game services installed in terminals of other members of the group may be displayed in the client terminal 320, and the user may select at least one of the game services that may be of interest to the user.

Then, a group score may be calculated based on a predetermined method (e.g., addition of individual game scores or activity scores of each member, or an average score of each member) (S2105). Accordingly, a ranking of the user within the group may be calculated (S2106), and a ranking among the groups may be calculated by comparing the calculated group score with scores of other groups (S2107). For example, in some cases, if the user selects one of the game services displayed on the client terminal 320, ranking information of the user with respect to other members having installed the game service selected by the user may be calculated.

The calculated ranking result may be displayed through the game service platform of the client terminal 320 (e.g., smart phone) of the user who has requested the group ranking inquiry (S2108).

FIG. 22 is a view showing an information storage table 2200 for providing a group ranking for each user according to exemplary embodiments of the present invention. Referring to FIG. 22, in order to provide a ranking of each group and a ranking among the groups according to exemplary embodiments of the present invention, it is preferable to collect and store a variety of information related to the group for each user.

For example, as shown in FIG. 22, information such as a user ID 2210, a nickname 2220, groups (tags) created by the user 2230, joined groups (tags) 2240, registered friends 2250, joined SNSs 2260, and user's scores 2270 can be stored and managed in each database.

Example of Implementing a Service

FIG. 23 is a view showing a screen of a smart phone 320. The screen displays a group ranking inquiry according to exemplary embodiments of the present invention. Referring to FIG. 23, if the group ranking of the game ranking menu is selected on the game service platform driven at the user's smart phone, a tag input window is provided for inputting a group name or a tag. If a group name or a tag is inputted as a keyword through the tag input window, a ranking of a group which sets the inputted keyword as a group name or a tag can be inquired about.

Figure 24:
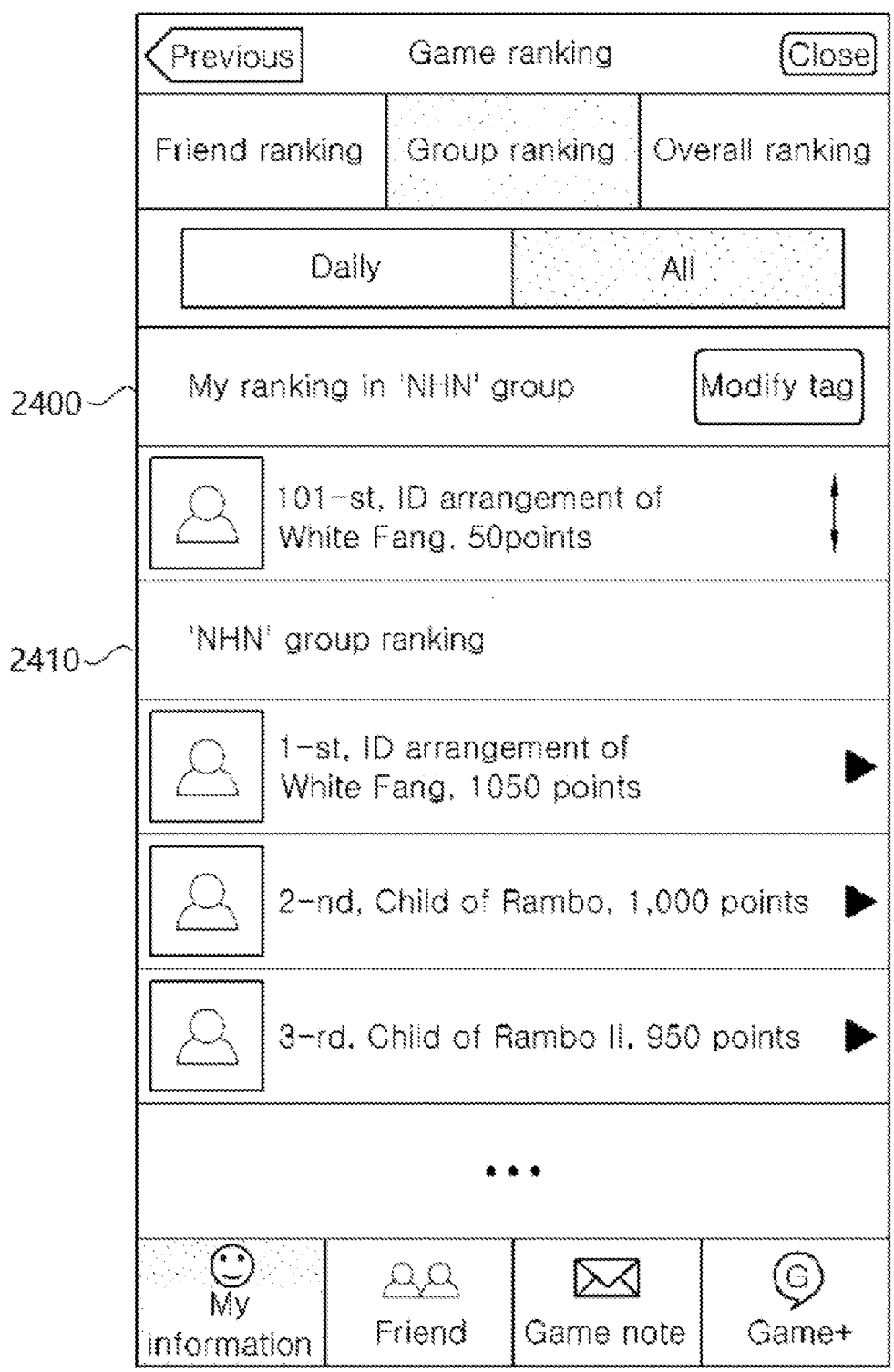
FIG. 24 is a view showing a screen of a smart phone, displaying a result of a group ranking inquiry according to an exemplary embodiment.

FIG. 24 is a view showing a screen of a smart phone 320 displaying a result of a group ranking inquiry according to exemplary embodiments of the present invention. Referring to FIG. 24, a daily or overall ranking of a group are provided as a result of the group ranking inquiry of FIG. 23, and ranking information of the user in the group can be confirmed. For example, as shown in the FIG. 24, if the joined group is 'NHN', the user's ranking information 2400 in the 'NHN' group and a ranking of the 'NHN' group 2410 compared with those of the other groups can be provided.

Figure 25:
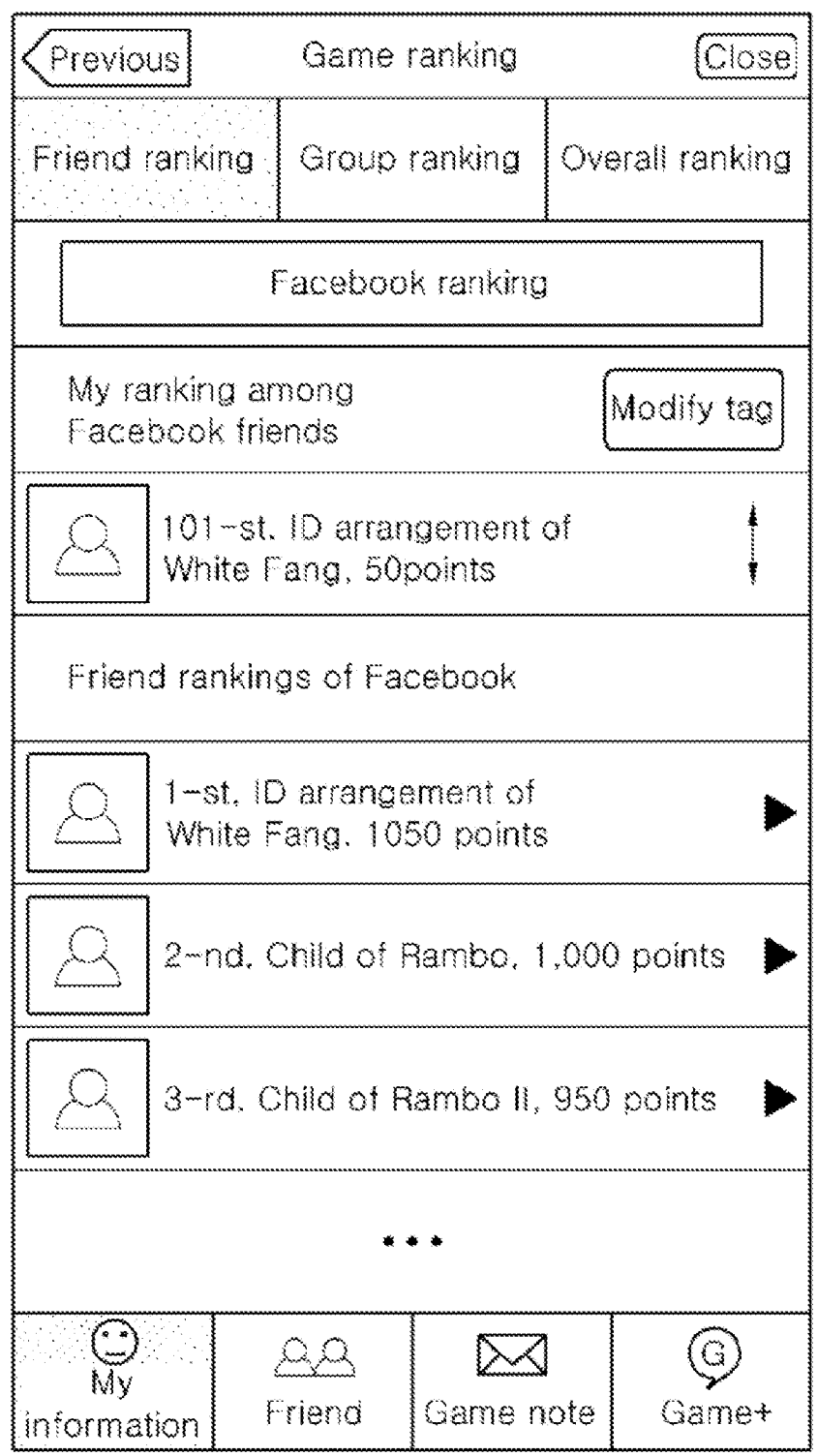
FIG. 25 is a view showing a screen of a smart phone, displaying a result of an SNS friend ranking inquiry according to an exemplary embodiment.

FIG. 25 is a view showing a screen of a smart phone 320 displaying a result of an SNS friend ranking inquiry according to exemplary embodiments of the present invention. Referring to FIG. 25, ranking information within a group created by some or all of the users who have joined an SNS (of which the user is already a member) as a friend may be determined. Ranking information within a group created by the user may also be obtained. As shown in FIG. 25, if a corresponding user has joined an SNS service such as Facebook®, the user may confirm his or her ranking among the user's friends registered in the Facebook® service.

Accordingly, a sense of belonging and solidarity of a community can be strengthened by confirming rankings within a group related to the user and rankings among the groups, and not by providing conventional meaningless overall ranking information.

Information for receiving the method for providing a ranking of a game group may be stored in a recording medium readable by a server computer. The recording medium includes all kinds of recording media which store programs and data so as to be read by a computer system. Examples of the recording medium include read-only memory (ROM), random access memory (RAM), DVD-ROM (digital video disk ROM), a magnetic tape, a floppy disk, an optical data storage device and the like, and a medium implemented in the form of a carrier wave, such as transmission through the Internet, is included as well. In addition, the recording media are distributed to computer systems connected through a network, and codes that can be read by a computer in a distributed manner can be stored and executed using the recording media.

Exemplary embodiments of the present invention can be implemented in a program command form that can be executed through a variety of computer means (e.g., processor) and recorded in a computer-readable medium. The computer-readable medium may include program commands, data files, and data structures in a single or combined form. The program commands recorded in the medium may be program commands specially designed and configured to execute exemplary embodiments of the present invention or program commands that are publicized and available for those skilled in the art of computer software. Examples of the computer-readable medium include magnetic media such as a hard disk, a floppy disk and a magnetic tape, optical media such as a CD-ROM and a DVD, magneto-optical media such as a floptical disk, and hardware devices specially configured to store and execute the program commands, such as ROM, RAM, and flash memory. Examples of the program commands include high-level language codes that can be executed by a computer using an interpreter, as well as machine codes such as those generated by a compiler. The hardware devices may be configured to operate as one or more software modules in order to perform operations of the present invention, and vice versa.

While the present invention has been described in connection with the exemplary embodiments illustrated in the drawings, they are merely illustrative embodiments, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should be defined by the technical spirit of the appended claims.

What is claimed is:

1. A method for providing a game in a game service platform system, the game service platform system comprising a game service platform server providing a plurality of games in association with a game server, a first user device of a first user, and a game server providing one of the plurality of games, the method being performed by the game service platform server, comprising:
   receiving a service request over a communication network to access a game service platform server from the first user device, wherein the service request is associated with account information of a social network service (SNS) subscribed by the first user;
   inquiring an acquaintance list, which contains SNS acquaintances of the first user for the SNS, to determine whether SNS acquaintances of the first user have joined the game service;
   registering, automatically, an SNS acquaintance as a game friend of the first user in response to a determination that the SNS acquaintance has joined the game service; and
   transmitting SNS acquaintance status information indicating whether each of the SNS acquaintance has joined the game service or not to the first user device,
   wherein the first user device provides a user interface to distinguish, using the SNS acquaintance status information, an SNS acquaintance who has joined the game service and an SNS acquaintance who has not joined the game service using the SNS acquaintance status information.

2. The method of claim 1 further comprising transmitting an invitation message to the SNS acquaintance who has not joined the game service in response to a request from the first user device.

3. The method of claim 2, wherein the invitation message comprises a direct link to a page for installation of the game.

4. The method of claim 1, the first user device receives a score of the game friend.

5. The method of claim 1, the first user device receives a score of the game friend from the game server.

6. A method performed by a game service platform server of a game service platform system, the game service platform server system comprising a game service platform server providing a game service platform, a first user device of a first user and a game server providing a game in association with the game service platform server, the method comprising:
   receiving, from the first user device, a request to access the game service platform server;
   determining whether the first user is a subscriber of the game service platform;
   authorizing execution of a game service platform software installed on the first user device and transmitting, to the first user device, a game list including a game service provided by the game service platform in response to the first user being determined as a subscriber of the game service platform;
   inquiring an acquaintance list, which contains social network service (SNS) acquaintances of the first user for the SNS, to determine whether the SNS acquaintances of the first user have joined the game service;
   registering, automatically, an SNS acquaintance as a game friend of the first user in response to a determination that the SNS acquaintance has joined the game service; and
   transmitting SNS acquaintance status information indicating whether each of the SNS acquaintance has joined the game service or not to the first user device,
   wherein the first user device provides a user interface to distinguish, using the SNS acquaintance status information, an SNS acquaintance who has joined the game service and an SNS acquaintance who has not joined the game service using the SNS acquaintance status information.

7. The method of claim 6 further comprising transmitting an invitation message to the SNS acquaintance who has not joined the game service in response to a request from the first user device.

8. The method of claim 7, wherein the invitation message comprises a direct link to a page for installation of the game service.

9. The method of claim 6, the first user device receives a score of the game friend from the game server.

10. A method performed by a game service platform server of a game service platform system, the game service platform server system comprising a game service platform server providing a game service platform, a first user device of a first user and a game server providing a game in association with a game service, the method comprising;
    providing a game list including a plurality of games for the first user device;
    inquiring an acquaintance list, which contains social network service (SNS) acquaintances of the first user for the SNS, to determine whether the SNS acquaintances of the first user has joined the game service;
    registering, automatically, an SNS acquaintance as a game friend of the first user in response to a determination that the SNS acquaintance has joined the game service; and
    providing the first user device with a game friend list including the game friend,
    wherein the first user device provides a user interface to distinguish an SNS acquaintance who has joined the game service and an SNS acquaintance who has not joined the game service using the SNS acquaintance status information using the game friend list.

11. The method of claim 10 further comprising transmitting an invitation message to the SNS acquaintance who has not joined the game service in response to a request from the first user device.

12. The method of claim 11, wherein the invitation message comprises a direct link to a page for installation of the game.

13. A non-transitory computer-readable storage medium having computer-executable instructions executed by a user device of a user, the instructions performing at least processes of:
   displaying a game service platform interface providing at least one game the user can select;
   executing a game software, in response to the user selection to access a game server for the executed game software; and
   inquiring an acquaintance list, which contains social network service (SNS) acquaintances of the user for an SNS, including SNS acquaintance status information indicating whether each of the SNS acquaintances has joined the game service or not to the first user device,
   wherein the user device provides a user interface to distinguish an SNS acquaintance who has joined the game service and an SNS acquaintance who has not joined the game service using the SNS acquaintance status information.

14. A non-transitory computer-readable storage medium of claim 13, wherein the invitation message comprises a link directly connecting to a page for installation of the game service.

15. A non-transitory computer-readable storage medium of claim 13, wherein the accessing the game service platform is based on an account information of the SNS.

16. A method for managing acquaintance information in association with an application, which provides a service dedicated to the application in association with a social network service (SNS) using the acquaintance information, the method performed by an SNS server providing the SNS, comprising:
   receiving from a first user device a request for the service, wherein a first user of the first user device is registered on the SNS, and the request for the service is submitted using an account of the first user for the SNS service;
   inquiring a member information database to determine, in response to the request for the service, whether the application is installed on a second user device, wherein a second user of the second user device is registered as an acquaintance of the first user for the SNS; and
   transmitting to the first user device a list of acquaintances in order that the application uses the list of acquaintances for the service,
   wherein the application displays, on the first user device, the second user, in response to determination that the application has been installed on the second user device, as an application friend of the first user using the list of acquaintances for the service.

17. A non-transitory computer-readable storage medium having computer-executable instructions executed by a first user device of a first user, the instructions performing at least processes of:
   executing an application in response to a selection by the first user, wherein the application provides a service dedicated to the application in association with a social network service (SNS);
   inquiring a member information database, which contains information on games a member of a game service platform has installed, to determine whether each SNS acquaintance who is a member of the game service platform has installed the application; and
   registering, automatically, an SNS acquaintance, in response to determination that the application has been installed on a second user device of the SNS acquaintance, as an application friend of the first user using the list of acquaintances for the service.

18. The method of claim 1, wherein the first user device displays ranking of the automatically registered game friend.

19. The method of claim 6, wherein the first user device displays ranking of the automatically registered game friend.

20. The non-transitory computer-readable storage medium of claim 13, wherein the instructions further performs a process of transmitting an invitation message, through the game service platform server, to an SNS acquaintance user who has not joined the game service.

* * * * *